US011823526B2

(12) United States Patent
Fritz et al.

(10) Patent No.: US 11,823,526 B2
(45) Date of Patent: Nov. 21, 2023

(54) SYSTEMS AND METHODS FOR ASSEMBLING GAMING MACHINES WITH MULTIPLE DISPLAYS

(71) Applicant: LNW Gaming, Inc., Las Vegas, NV (US)

(72) Inventors: Michael Fritz, Reno, NV (US); Neil Sholes, Manchester (GB); Jerad Deitrick, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 45 days.

(21) Appl. No.: 17/341,610

(22) Filed: Jun. 8, 2021

(65) Prior Publication Data

US 2022/0180695 A1 Jun. 9, 2022

Related U.S. Application Data

(60) Provisional application No. 63/123,106, filed on Dec. 9, 2020.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ...... *G07F 17/3216* (2013.01); *G07F 17/3211* (2013.01)

(58) Field of Classification Search
CPC ............................ G07F 17/32; G07F 17/3213
USPC ............................ 463/20, 22, 25, 30, 31, 39
See application file for complete search history.

(56) References Cited

U.S. PATENT DOCUMENTS

| | | | |
|---|---|---|---|
| 6,201,703 | B1 | 3/2001 | Yamada et al. |
| 6,454,649 | B1 | 9/2002 | Mattice et al. |
| 6,491,298 | B1 | 12/2002 | Criss-Puszkiewicz et al. |
| 8,439,761 | B2 | 5/2013 | O'Keene et al. |
| 9,697,679 | B2 | 7/2017 | Ho et al. |
| 10,287,148 | B2 | 5/2019 | Urban et al. |
| 10,445,973 | B2 | 10/2019 | Schoonmaker et al. |
| 10,504,319 | B2 | 12/2019 | Priddy |
| 10,506,730 | B2 | 12/2019 | Wand et al. |
| 10,573,118 | B2 | 2/2020 | Goldstein et al. |
| 10,723,604 | B2 | 7/2020 | Urban et al. |
| 10,861,280 | B2 | 12/2020 | Schoonmaker et al. |
| 11,004,301 | B2 | 5/2021 | Priddy |
| 2004/0018877 | A1 | 1/2004 | Tastad et al. |

(Continued)

*Primary Examiner* — Adetokunbo O Torimiro

(57) ABSTRACT

A gaming machine assembly comprises a cabinet, an upper display, a winch, and a lower display. The cabinet includes a lower support and an upper support that is hinged to the lower support and rotatable relative to the lower support between a lower position and an upper position. The upper support overlaps the lower support when in the lower position and is disposed above the lower support when in the upper position. The upper display is initially mounted onto the lower support while the upper support is in the upper position. The winch extends between the lower support and the upper support and is connected to the mounted upper display to lift the upper display from the lower support to the upper support. The lower display is mounted onto the lower support after the upper display is lifted from the lower support to the upper support.

20 Claims, 22 Drawing Sheets

(56) References Cited

U.S. PATENT DOCUMENTS

| | | | |
|---|---|---|---|
| 2004/0053699 | A1 | 3/2004 | Rasmussen et al. |
| 2006/0281558 | A1* | 12/2006 | Rifkin ..................... G07F 17/32 463/46 |
| 2008/0311976 | A1 | 12/2008 | Hashimoto |
| 2009/0005178 | A1 | 1/2009 | Abe et al. |
| 2009/0280911 | A1 | 11/2009 | Tsao |
| 2010/0099502 | A1 | 4/2010 | Cole |
| 2011/0136573 | A1 | 6/2011 | Mccomb et al. |
| 2015/0302683 | A1 | 10/2015 | Matsushita et al. |
| 2020/0077529 | A1 | 3/2020 | Wand et al. |
| 2020/0098219 | A1 | 3/2020 | Goldstein et al. |
| 2020/0111285 | A1* | 4/2020 | Phillips, Jr. ......... G07F 17/3216 |
| 2021/0074118 | A1 | 3/2021 | Schoonmaker et al. |

* cited by examiner

SYSTEMS AND METHODS FOR ASSEMBLING GAMING MACHINES WITH MULTIPLE DISPLAYS

CROSS-REFERENCE TO RELATED APPLICATIONS

This application claims the benefit of priority to U.S. Provisional Patent Application No. 63/123,106, filed Dec. 9, 2020, the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2021, SG Gaming, Inc.

FIELD

The present disclosure relates generally to gaming systems, apparatus, and methods and, more particularly, to gaming machines with multiple displays and assembly methods of multiple-display gaming machines.

BACKGROUND

Gaming machines, such as electronic gaming machines (EGMs), are a cornerstone of the gaming industry. These gaming machines conduct and/or present various games to players. Typically, gaming machines include at least one presentation device (e.g., audiovisual output devices, such as displays and speakers) and at least one input device (e.g., player input devices, credit input devices, etc.) to facilitate player interaction with the games. The presentation devices may be mechanical, digital, or combinations thereof.

Over time, the gaming industry continues to explore new ways of attracting players to gaming machines, such as exploring new game features and/or attraction presentations. Another method of attracting players is to provide new gaming machine configurations to provide a unique gaming experience to the players. Such gaming machine configurations may include, for example, providing unique or unusual input devices, lighting devices, or seating arrangements to the player, or including additional and/or unique display devices. These hardware configurations may facilitate unique gaming experiences for players purely from the hardware itself or in combination with software elements of the gaming machine (e.g., new and/or improved game features are facilitated by the hardware configuration).

However, the increased complexity of gaming machines may result in challenges with assembly, deployment, and/or the structural integrity of the gaming machines. That is, additional components may increase the weight and/or dimensions of the gaming machine and certain hardware configurations may create stress points in the gaming machine, thereby potentially increasing the risk of damage to the gaming machine or requiring maintenance in reduced intervals.

As a result, new and improved gaming machine configurations and methods of assembly are needed to accommodate the hardware attractions of the gaming machines.

SUMMARY

According to one aspect of the present disclosure, a method of assembling a gaming machine is provided. The gaming machine includes a cabinet, a lower display, and an upper display. The cabinet includes a lower support and an upper support that is hinged to the lower support and rotatable relative to the lower support between a lower position and an upper position. The upper support overlaps the lower support when in the lower position and is disposed above the lower support when in the upper position. The lower display and the upper display are initially separate from the cabinet. The method comprising the operations of rotating the upper support from the lower position to the upper position, mounting, while the upper support is in the upper position, the upper display onto the lower support, connecting the mounted upper display to a winch extending between the lower support and the upper support, operating the winch to lift the upper display from the lower support to the upper support, and mounting, after the upper display is lifted from the lower support to the upper support, the lower display onto the lower support.

According to another aspect of the disclosure, a gaming machine assembly comprises a cabinet, an upper display, a winch, and a lower display. The cabinet includes a lower support and an upper support that is hinged to the lower support and rotatable relative to the lower support between a lower position and an upper position. The upper support overlaps the lower support when in the lower position and is disposed above the lower support when in the upper position. The upper display is initially mounted onto the lower support while the upper support is in the upper position. The winch extends between the lower support and the upper support and is connected to the mounted upper display to lift the upper display from the lower support to the upper support. The lower display is mounted onto the lower support after the upper display is lifted from the lower support to the upper support.

According to yet another aspect of the disclosure, a gaming machine assembly comprising a cabinet, a winch, a lower display, and an upper display. The cabinet includes a lower support and an upper support that is hinged to the lower support and rotatable relative to the lower support between a lower position and an upper position. The upper support overlaps the lower support when in the lower position and is disposed above the lower support when in the upper position. The winch extends between the lower support and the upper support. While the upper support is in the upper position, the upper display is mounted onto the lower support, connected to the winch, and then lifted from the lower support to the upper support by operating the winch. After the upper display is lifted from the lower support to the upper support, the lower display is mounted onto the lower support.

Additional aspects of the invention will be apparent to those of ordinary skill in the art in view of the detailed description of various embodiments, which is made with reference to the drawings, a brief description of which is provided below.

Figure 1:
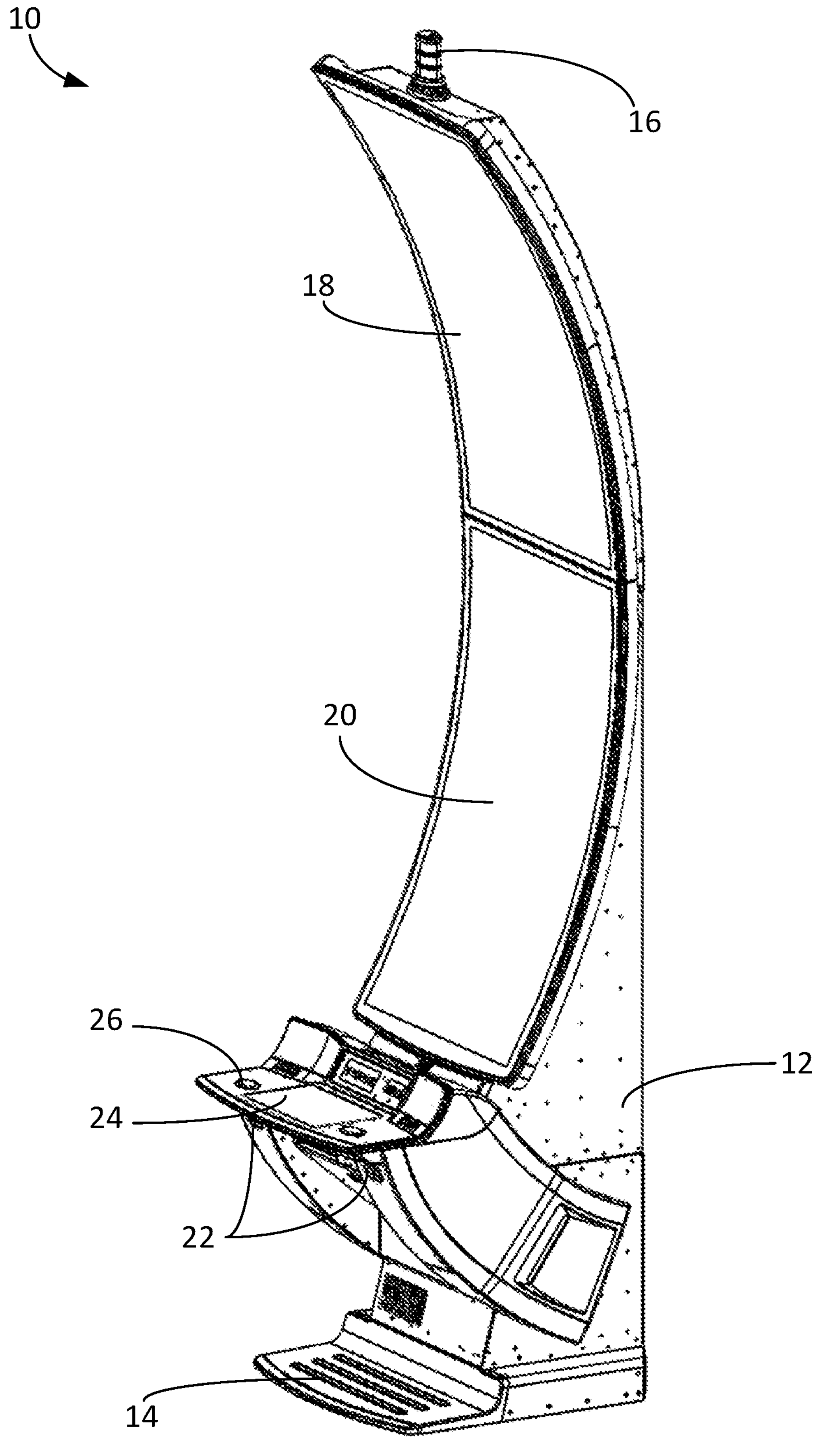
FIG. 1 is a perspective view of a free-standing gaming machine according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games. In other embodiments, the "games" referred to herein may not be limited to traditional casino games, but rather other suitable games may be incorporated with the gaming machines described herein.

The systems and methods described herein include a gaming machine having at least two supports for receiving display devices. In the example embodiment described herein, the gaming machine includes two supports in a vertical stack configuration (i.e., an upper support and a lower support). The upper support is hinged to fold down to a lower position that vertically overlaps the lower support, thereby decreasing the height of the gaming machine for deployment in a gaming environment. To deploy the gaming machine of the systems and methods described herein, the gaming machine is moved at or near the deployment location with the upper support in the lower position and no display devices within the two supports. Then, the upper support is unfolded to an upper position above the lower support, and an upper display is mounted to the lower support for transfer to the upper position. More specifically, a winch is connected to the upper display that is configured to pull or guide the upper display from the lower support to the upper support. The upper display is then secured to the upper support, and a lower display is mounted to the lower support. The upper and lower displays form a vertical stack that may be used to present game presentation elements across the two stacked displays. In other embodiments of the systems and methods described herein, additional, fewer, or alternative configurations of the gaming machine and/or steps of assembly may be used, including those described elsewhere herein.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 includes a footrest 14 at the base that may also include one or more compartments for storing tools and/or removable components as described herein. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include an upper display 18, a lower display 20, and one or more audio speakers 22. The upper display 18 or the lower display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the upper or lower displays, buttons 26 on a button panel, a bill/ticket acceptor, a card reader/writer, a ticket dispenser, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a “Max Bet” button or soft key to indicate a player’s desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the “credits” meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor, the card reader/writer, a wireless communication interface for reading cash or credit data from a nearby mobile device, and a network interface for withdrawing cash or credits from a remote account via an electronic funds transfer. In response to a cashout input that initiates a payout from the credit balance on the “credits” meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer, the ticket dispenser for printing tickets redeemable for cash or credits, a wireless communication interface for transmitting cash or credit data to a nearby mobile device, and a network interface for depositing cash or credits to a remote account via an electronic funds transfer.

Figure 2:
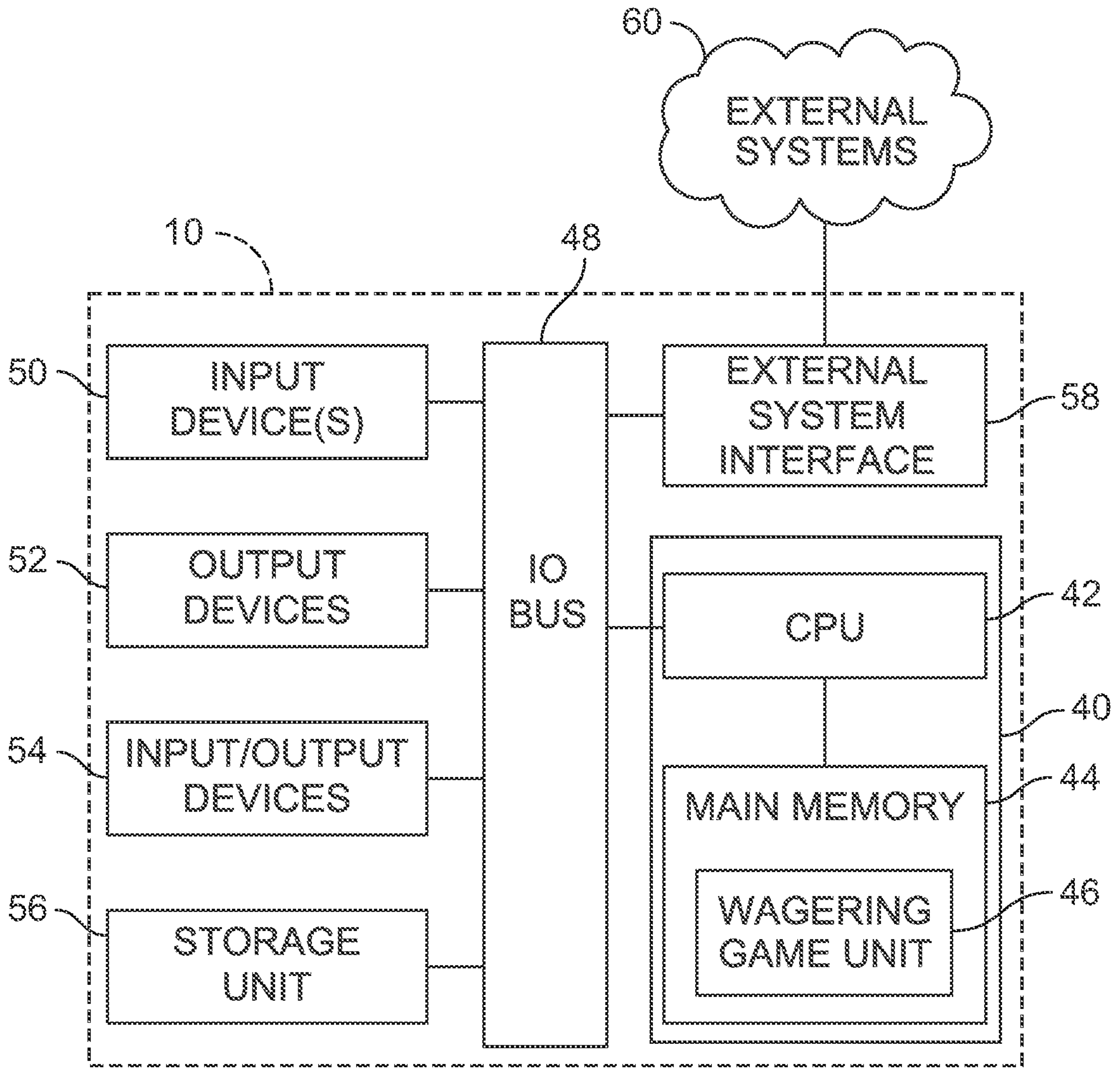
FIG. 2 is a schematic view of a gaming system according to one or more embodiments of the present disclosure.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
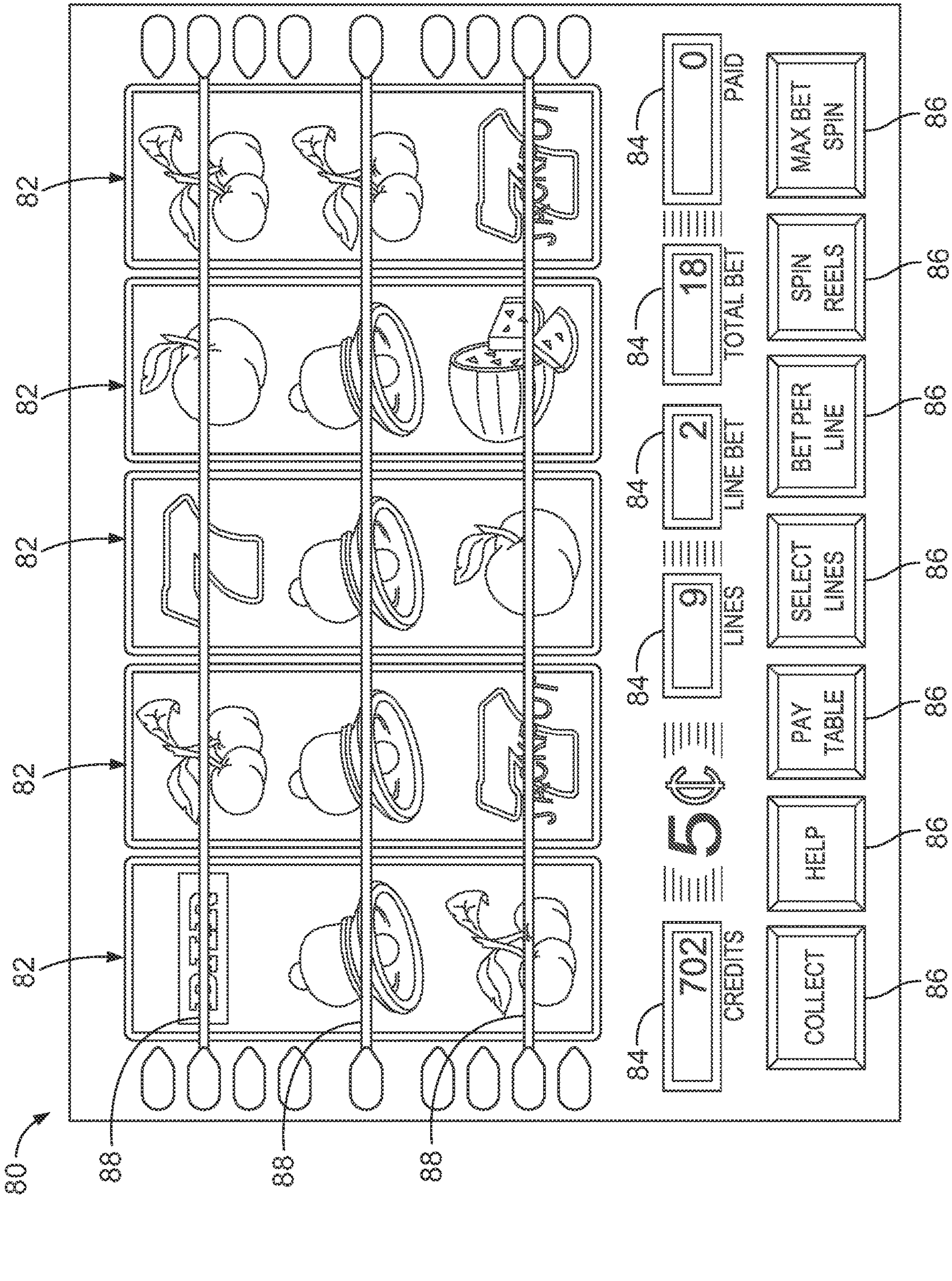
FIG. 3 is an image of an exemplary basic-game screen of a wagering game displayed on a gaming machine, according to one or more embodiments of the present disclosure.

Referring now to FIG. 3, there is illustrated an image of a basic-game screen 80 adapted to be displayed on the upper display 18 or the lower display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the upper display 18 or the lower display 20 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., the upper display 18 or the lower display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the upper display 18, other display device, or other output device (e.g., speakers, lights, communication device, etc.) to change from a first state to at least a second state, wherein the second state of the upper display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

With reference again to FIG. 1, the display assembly of the gaming machine 10 (i.e., the displays 18, 20) may have a height and weight that may be difficult to transport, store, and/or install the gaming machine 10 in an unfolded or deployed state as shown in FIG. 1. That is, the displays 18, 20 may be too large to fit the gaming machine 10 in a variety of transportation, storage, and/or access points (e.g., doors). For example, the displays 18, 20 may be curved displays having a diagonal screen width of 55 inches, which may result in the gaming machine 10 having an overall height approximately around 4 feet tall in the deployed state. To facilitate ease of transportation, storage, and installation of the gaming machine 10, the gaming machine 10 may be configurable in a plurality of states, and the displays 18, 20 may be removable from the machine 10 to increase the portability of the machine 10 and increase the ease of installation of the machine 10 as described herein.

Figure 4:
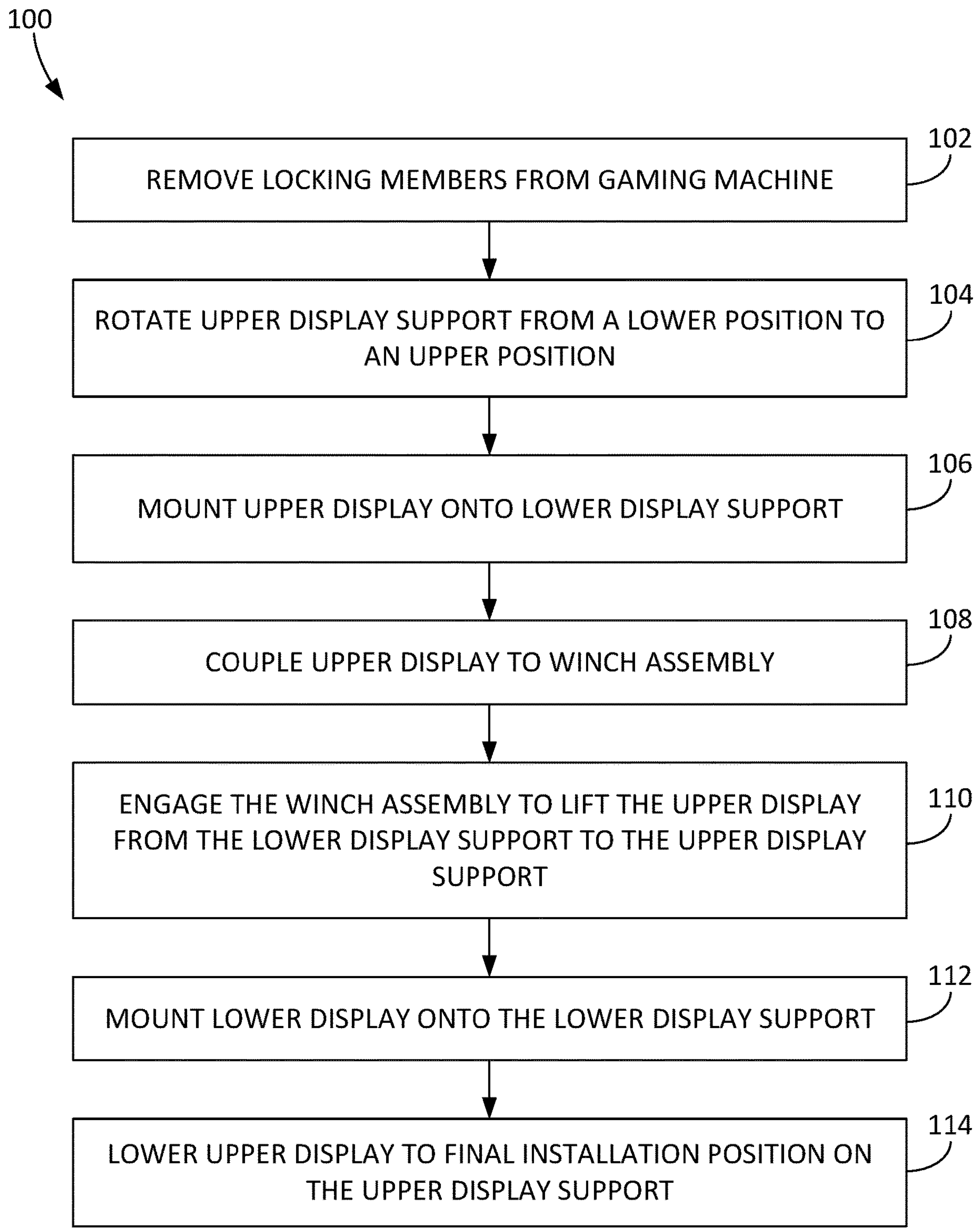
FIG. 4 is a flow diagram of an example method of deploying a gaming machine having a plurality of displays, according to one or more embodiments of the present disclosure.
Figure 5:
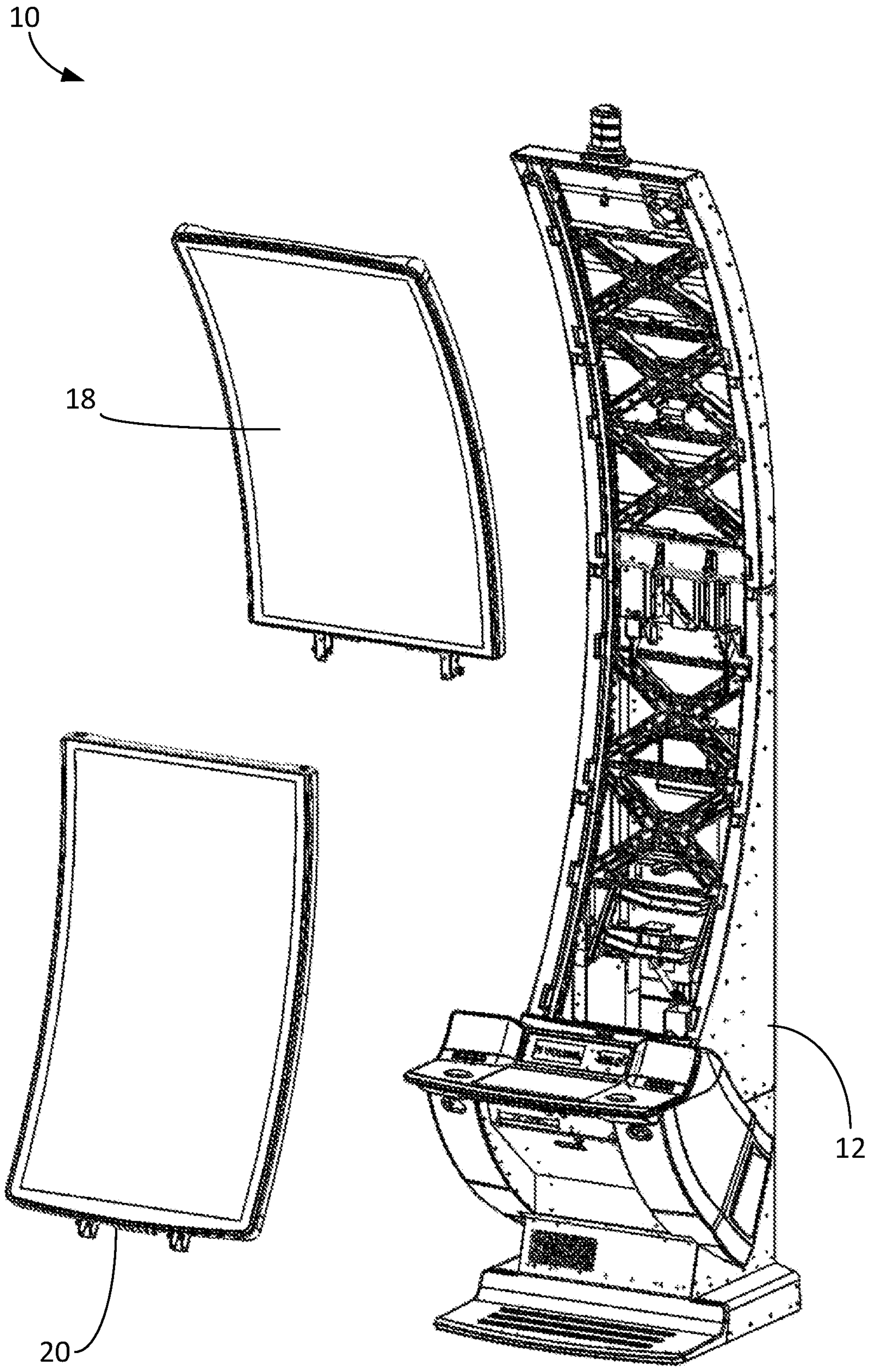
FIG. 5 is an exploded view of the example gaming machine shown in FIG. 1, according to one or more embodiments of the present disclosure.

FIG. 4 is a flow diagram of an example method 100 for transporting and installing the gaming machine 10 shown in FIG. 1 at an installation point (e.g., within a casino). As shown in the example exploded view of the gaming machine 10 depicted in FIG. 5, the displays 18, 20 are selectively removable from the cabinet 12. The displays 18, 20 may be transported separately from the cabinet 12 to enable the cabinet 12 to be transported in a compact form to limit or prevent issues regarding the height of the gaming machine 10 during transportation, storage, and installation. The method 100 includes a series of steps that may enable technicians to convert the gaming machine 10 from the compact state to a deployed state (e.g., the state shown in FIG. 1). The foregoing figures illustrate various states of the gaming machine 10 through the steps of the method 100 as described herein. It is to be understood that, in other embodiments, the method 100 may include additional, fewer, or alternative steps, including those described elsewhere herein. Additionally or alternatively, the gaming machine 10 may include additional, fewer, or alternative components for use with the method 100.

Figure 6:
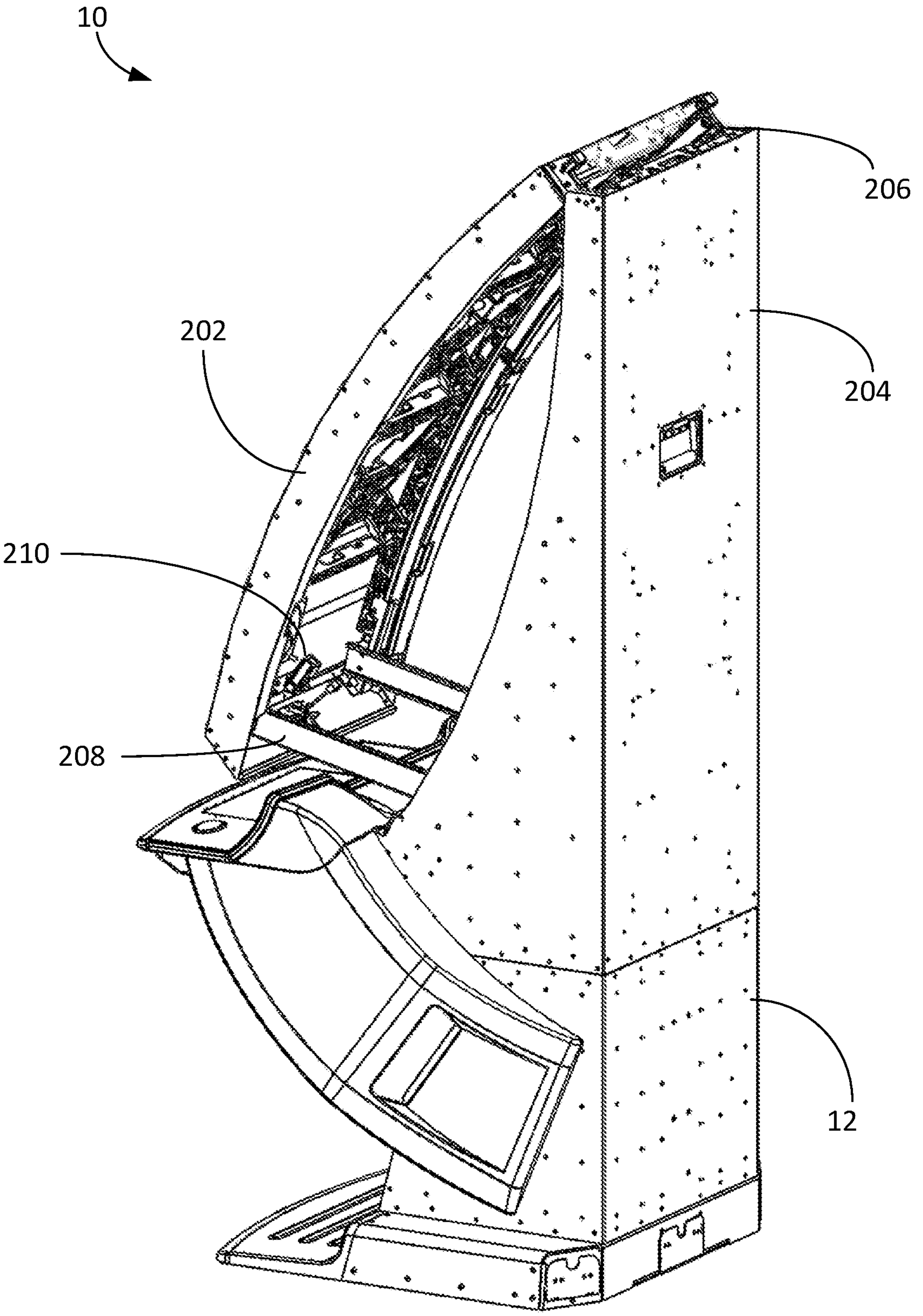
FIG. 6 is a perspective view of the example gaming machine shown in FIG. 1 in a folded or closed configuration, according to one or more embodiments of the present disclosure.

FIG. 6 illustrates the gaming machine 10 in a folded or transportation state with the displays 18, 20 removed. In the example embodiment, the gaming machine 10 includes an upper display support 202, a lower display support 204, and a hinge 206 coupled between the display supports 202, 204. The display supports 202, 204 are coupled in a vertical configuration, and the hinge 206 articulates the upper display support 202 between the folded state and an unfolded state (shown in FIG. 1). In the folded state, the height of the gaming machine 10 is reduced, which may increase the compatibility of the gaming machine 10 with transportation vehicles, doors, ceilings, and/or other height-restricted devices and elements that the gaming machine 10 may encounter during transport, storage, and/or deployment.

To keep the gaming machine 10 in the folded state, the gaming machine 10 includes one or more locking members 208. The locking members 208 may be coupled to the upper display support 202 and/or the hinge 206 to prevent the upper display support 202 from rotating around the hinge 206 or otherwise moving in the folded state. In the example embodiment, two bracket-style locking members 208 extend from the cabinet 12 to couple to the upper display support 202. In at least this embodiment, the locking members 208 may be temporary components that may be removed entirely during or after deploying the gaming machine 10 in the unfolded state. In certain embodiments, the locking members 208 may be integrated with the gaming machine 10 or selectively coupled to the gaming machine 10 in a manner out of the way of the player area of the gaming machine 10. In other embodiments, other suitable configurations of locking members 208 (including configurations with one locking member 208 or different types of locking members 208) may be used with the gaming machine 10.

With respect to FIG. 4, at step 102, the locking members 208 are removed from the upper display support 202 and the cabinet 12 to deploy the upper display support 202. In other embodiments, rather than removing the locking members 208, the locking members 208 may be disengaged from the upper display support 202 and/or the cabinet 12 to enable the upper display support 202 to rotate. At step 104, the upper display support 202 is rotated around the hinge 206 to unfold the upper display support 202 into the unfolded state. That is, the upper display support 202 is rotated from a lower position to an upper position. In at least some embodiments, the gaming machine 10 may include one or more components to aid technicians with rotating the upper display support 202 safely and securely. For example, the upper display support 202 may include an adapter 210 for receiving a pole from the technician, thereby enabling the technician to be able to rotate the upper display support 202 without requiring side access to the gaming machine 10. In another example, the gaming machine 10 may include a motor that automatically rotates the upper display support into an upright or unfolded position.

Figure 7:
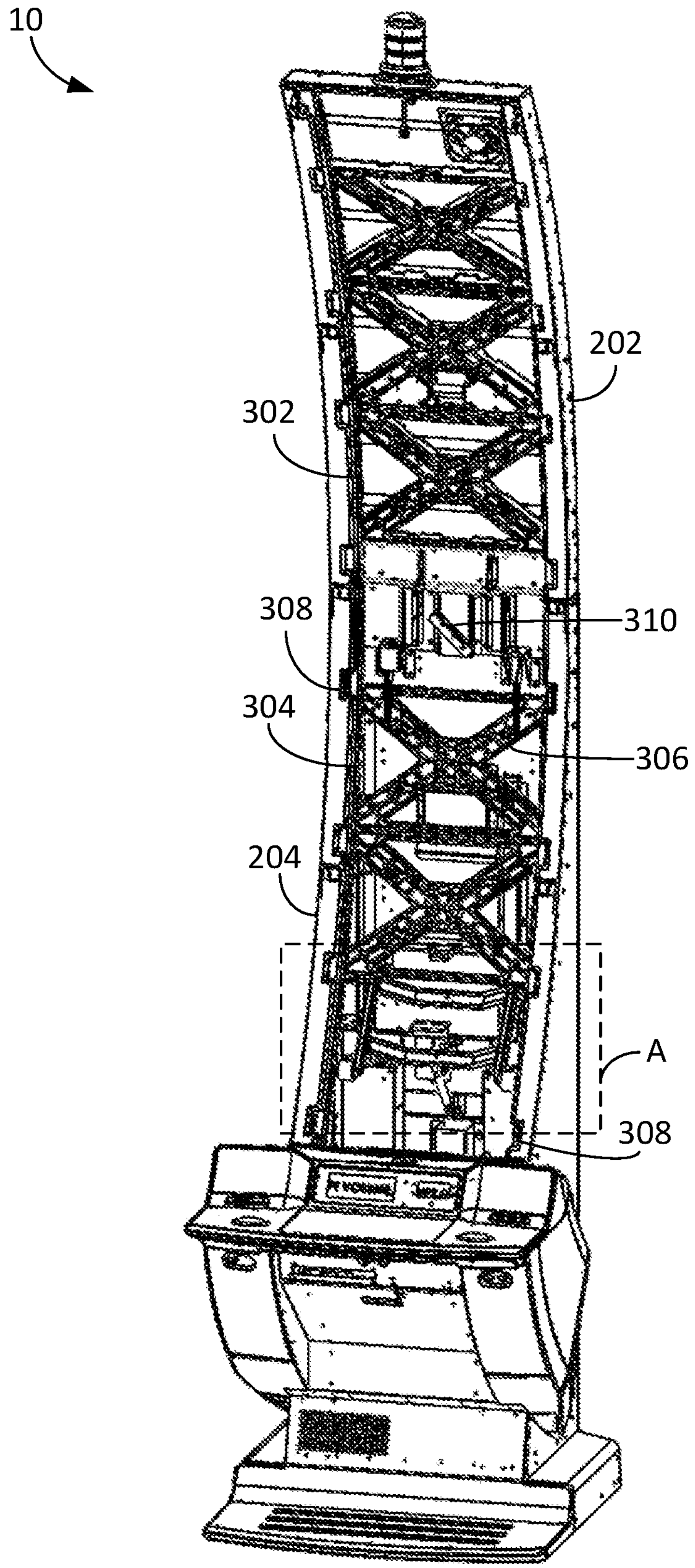
FIG. 7 is a perspective view of the gaming machine shown in FIG. 1 in an upright or unfolded configuration, according to one or more embodiments of the present disclosure.

FIG. 7 is a front perspective view of the gaming machine 10 in the unfolded state without the displays 18, 20 installed. In the example embodiment, the gaming machine 10 includes a plurality of structural elements to facilitate installation and securing the displays 18, 20. More specifically, the gaming machine 10 includes a pair of upper rails 302, a pair of lower rails 304, and a plurality of cross supports 306. In other embodiments, the gaming machine 10 may include additional, fewer, or alternative supporting components, including those described elsewhere herein.

In the example embodiment, the upper display support 202 includes the upper rails 302, and the lower display support 204 includes the lower rails 304. In the unfolded state, each upper rail 302 is aligned with a respective lower rail 304 to form two longitudinally opposed rails. Each rail 302, 304 may be further formed from a plurality of subrails. As described in detail herein, the rails 302, 304 are configured to receive display assemblies and enable the display assemblies to move vertically along the rails. The display supports 202, 204 and the associated rails 302, 304 may have any suitable shape or curvature to receive the displays 18, 20. For example, the displays 18, 20 have a concave curvature, and the displays supports 202, 204 have a similar concave curvature to receive the displays 18, 20.

In the example embodiment, the lower rail 304 includes a plurality of openings 308 for receiving mounting components of the upper display 18 as described within. That is, the mounting components are configured to fit within the openings 308 to enter the lower rail 304. The mounting components may be securely but movably coupled to the rails 302, 304 unless otherwise passing the openings 308, which may facilitate the removal of the display 18 as well as the installation. Although there are sixteen openings 308 in total on the rails 302, 304, all but four (in two opposing pairs) on the lower rail 304 may be blocked off to prevent the display 18 from exiting the rails 302, 304. The unblocked openings 308 are used to mount and dismount at least the upper display 18 from the rails 302, 304. The other openings 308 may be blocked off using a bracket or other suitable component. These blocked openings 308 may be a result of the rails 302, 304 being formed from a plurality of identical rail components, which may decrease the manufacturing complexity and/or cost of the rails 302, 304. The rails 302, 304 may include additional or alternative suitable openings to enable an interface between the mounting components and the remainder of the display 18 to pass unimpeded.

The cross supports 306 are coupled between the two rails to provide additional structural support to the gaming machine 10. The cross supports 306 also function as secure coupling points for other components of the gaming machine 10 or to isolate components from one another, such as isolating a mechanically moving component from other components that might block said movement. The gaming machine 10 may include one or more cross supports 306, and the cross supports 306 may be in any suitable configuration. For example, the cross supports 306 may be horizontally bars coupled between the rails 302, 304. In some embodiments, the cross supports 306 are coupled directly to the rails 302, 304. In other embodiments, the cross supports 306 are coupled to other suitable components of the display supports 202, 204. The cross supports 306 may be formed from any suitable material or combination of materials. In one example, the cross supports 306 may be partially formed from a foam material or another suitable material that prevents or limits wear on cables rubbing against the cross supports 306. In certain embodiments, different cross supports 306 may be formed from different materials.

In at least some embodiments, the display supports 202, 204 may include any suitable configuration of components that facilitate securing the displays 18, 20 to the gaming machine 10, electrically and/or communicatively coupling the displays 18, 20 to the logic circuitry of the gaming machine 10, and/or providing load transfer between the displays 18, 20 and the gaming machine 10, including those described elsewhere herein.

In addition to the structural components of the display supports 202, 204, FIG. 6 depicts several components of the gaming machine 10 associated with the display devices 18, 20. More specifically, FIG. 7 depicts a cable routing assembly 310 and a damping assembly 312. The cable routing assembly 310 is configured to facilitating the routing the data, power, and/or other suitable cables to the upper display 18 when the upper display is in the upper display support 202, such as the state shown in FIG. 1. The cable routing assembly 310 defines one or more channels or grooves that a technician can place cables within, which may prevent the cables from being tangled or being in a position that may cause accelerated wear on the cables.

The damping assembly 312 is configured to facilitate the mounting of the displays 18, 20 within the lower display support 204. More specifically, the damping assembly 312 is configured to engage the displays 18, 20 as the displays 18, 20 are rotated into the lower display support 204 as described herein. The damping assembly 312 applies an outward force relative the lower display support 204 on the mounting display that is at least partially opposite the direction of the display's movement (i.e., towards the lower display support 204), thereby reducing or limiting the force from the display colliding with the lower display support 204.

Figure 8:
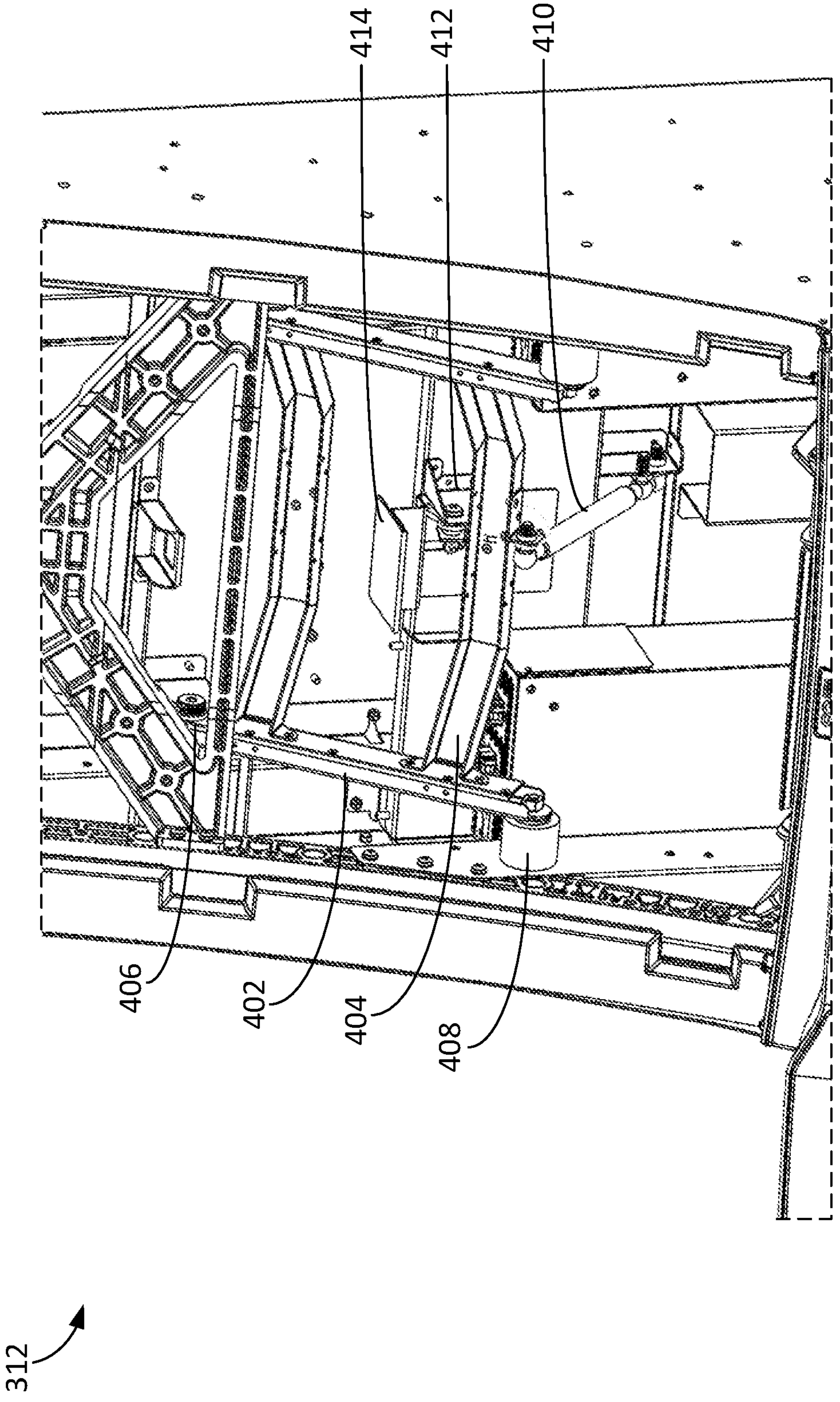
FIG. 8 is a perspective view of an example damping mechanism for the gaming machine shown in FIG. 1, according to one or more embodiments of the present disclosure.

FIG. 8 is a close-up view of the damping assembly 312 as indicated by the box labeled 'A' in FIG. 7. In the example embodiment, the damping assembly 312 includes a pair of arms 402, a pair of support brackets 404, a pair of pivot members 406, a pair of rollers 408, a piston 410, a locking mechanism 412, and a paddle 414. In other embodiments, the damping assembly 312 may include additional, fewer, or alternative components, including those described elsewhere herein. In certain embodiments, the gaming machine 10 may not include any damping assembly 312.

The arms 402 may be positioned between and extend parallel to the two lower rails 304. Relative to the lower display support 204, the pivot members 406 are coupled to a proximal end of the arms 402, and the rollers 408 are coupled to a distal end of the arms 402. The pivot members 406 enable the arms 402 to rotate. The support brackets 404 extended between the two arms 402 and are positioned between the proximal and distal ends of the arms 402. In the example embodiment, the piston 410 is coupled to one of the support brackets 404. The piston 410 is configured to apply an outward (relative to the lower display support 204) bias force on the arms 402 via the support bracket 404, which causes the arms 402 to be biased to extend outward. In certain embodiments, the piston 410 may be coupled to a different component of the damping assembly 312 or at a different location on the support bracket 404. It is to be understood that the damping assembly 312 may include additional or alternative components for applying this bias force on the arms 402. For example, the damping assembly 312 may include additional pistons 410 and/or springs to apply the bias force. In another example, rather than a bias force, the damping assembly 312 may be configured to rely upon an external force (e.g., a manual force or a force applied by a motor). In such an example, the damping assembly 312 may include a suitable interface for receiving and applying the external force.

In the example embodiment, the damping assembly 312 is configured to engage the displays 18, 20 using the rollers 408. The rollers 408 enable the damping assembly 312 to maintain contact with the displays 18, 20 as the displays 18, 20 are rotated into the lower display support 204 as described herein. When the rollers 408 engage the displays 18, 20, the bias force from the piston 410 is applied to the displays 18, 20 to at least partially counteract the movement of the displays 18, 20 towards the lower display support 204. This counteracting force may be beneficial in smoothing the movement of the displays 18, 20, reducing the impact force from the displays 18, 20 being dropped into the lower display support 204, and/or reducing the load on the technicians mounting the displays 18, 20. The bias force may be calibrated such that the bias force does not hinder the mounting of the displays 18, 20 (i.e., the bias force pushes the displays 18, 20 out of the lower rails 304 without a technician applying additional force to the displays 18, 20).

As described herein, the upper display 18 is mounted first to the lower display support 204 and is raised up to the upper display support 202 (shown in FIG. 7) to facilitate mounting the lower display 20. The damping assembly 312 may be configured to receive the upper display 18 and, as the display 18 is raised beyond the reach of the rollers 408, return to an extended position to receive the lower display 20. After the lower display 20 is received, the damping assembly 312 may be secured or locked in a retracted position such that the damping assembly 312 does not apply the bias force to the lower display 20. In the example embodiment, the lower display 20 includes one or more components as described herein that push the arms 402 beyond a threshold position towards the lower display support 204 to engage the locking mechanism 412. The locking mechanism 412 is configured to selectively couple to one or more moving components of the damping assembly 312 to prevent movement of the damping assembly 312 until the locking mechanism is disengaged. In the example embodiment, the locking mechanism 412 is configured to engage the lower support bracket 404 that is coupled to the piston 410 to prevent the rotation of the arms 402. The locking mechanism 412 may remain engaged until the lower display 20 is removed from the gaming machine 10 (e.g., for maintenance or transportation). To disengage the locking mechanism 412, the paddle 414 is provided. More specifically, the paddle 414 is configured to enable a technician to manually disengage the locking mechanism 412. Depressing the paddle 414 causes the locking mechanism 412 to release the lower support bracket 404 and enable the arms 402 to rotate around the pivot members 406. In other embodiments, other suitable locking mechanism 412 and/or interfaces for engage or disengaging the locking mechanism 412 may be used. For example, rather than a technician manually disengaging the locking mechanism 412, the lower display 20 may include one or more components that automatically disengage the locking mechanism when the lower display 20 is removed.

Figure 9:
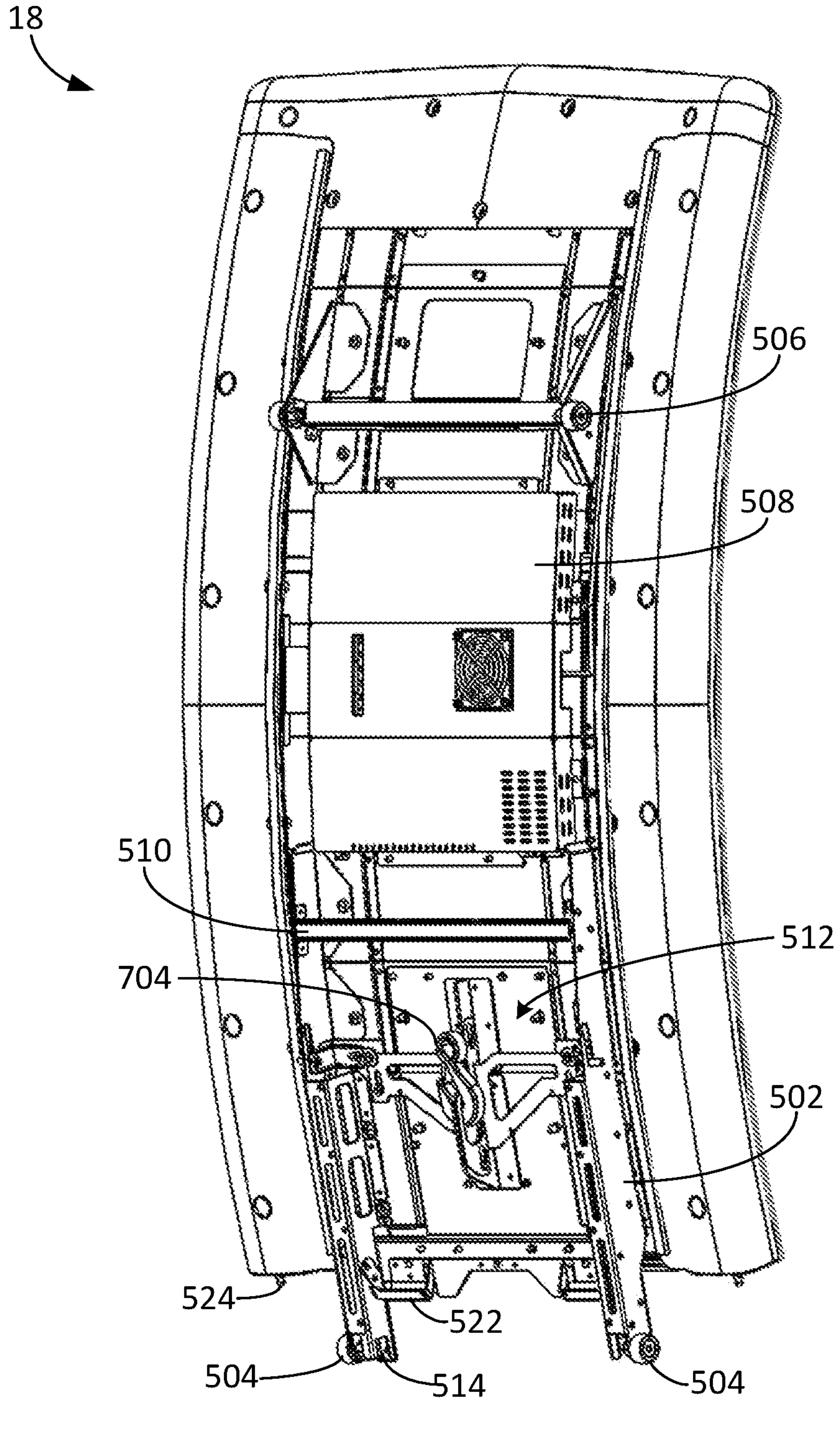
FIG. 9 is a back perspective view of an example upper display, according to one or more embodiments of the present disclosure.
Figure 10:
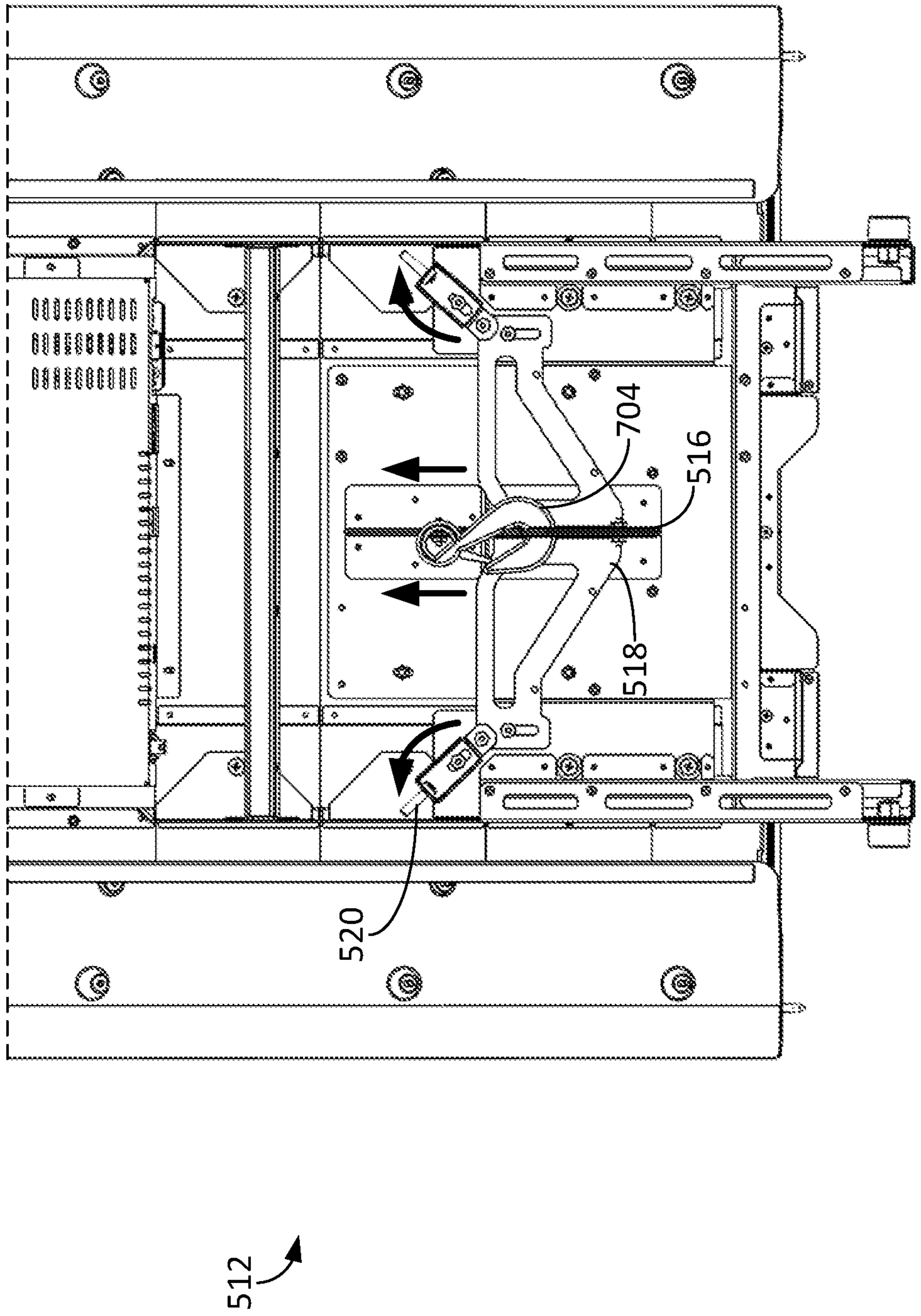
FIG. 10 is a back view of an example coupling mechanism for the upper display shown in FIG. 9.
Figure 11:
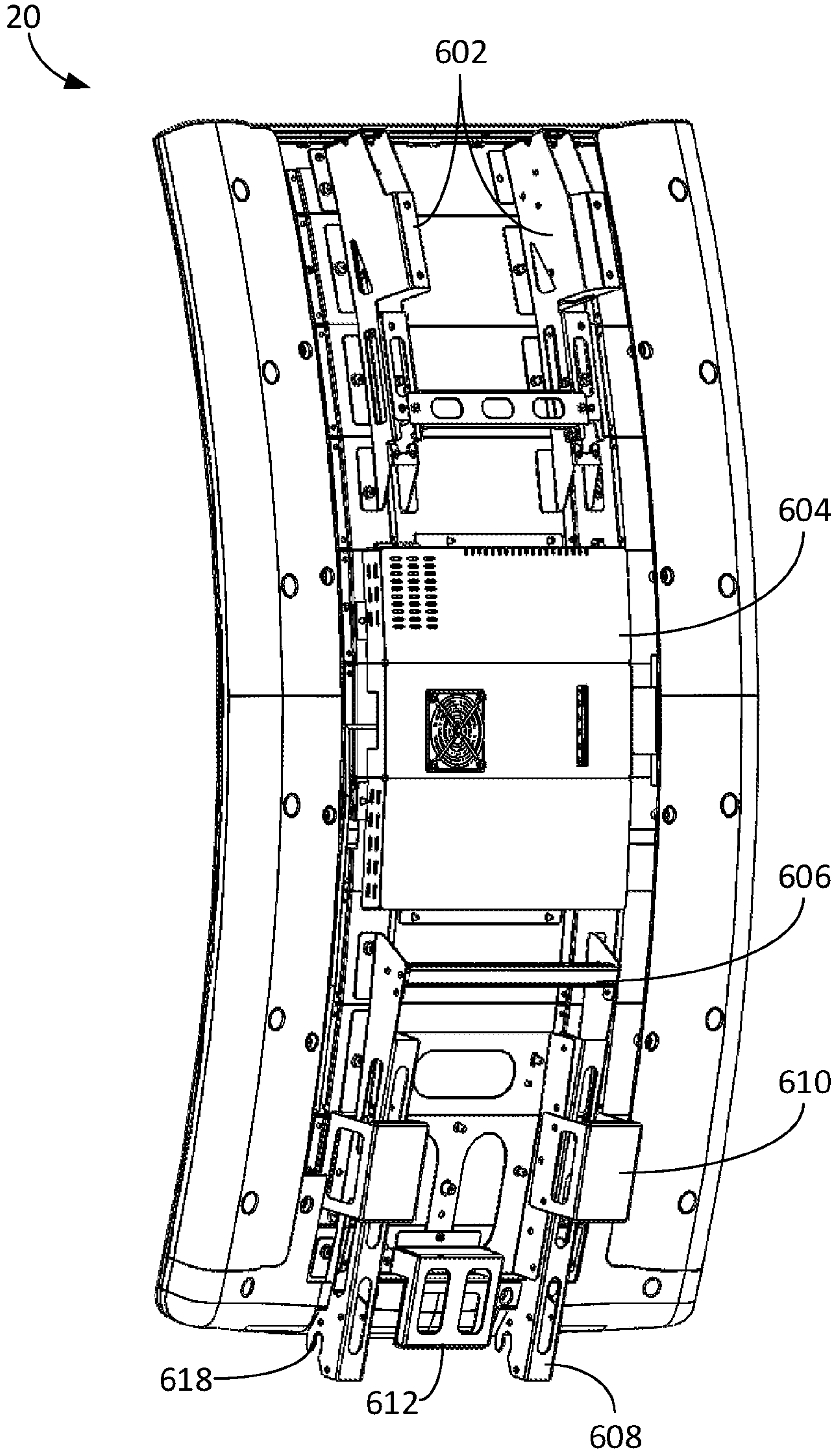
FIG. 11 is a back perspective view of an example lower display, according to one or more embodiments of the present disclosure.
Figure 12:
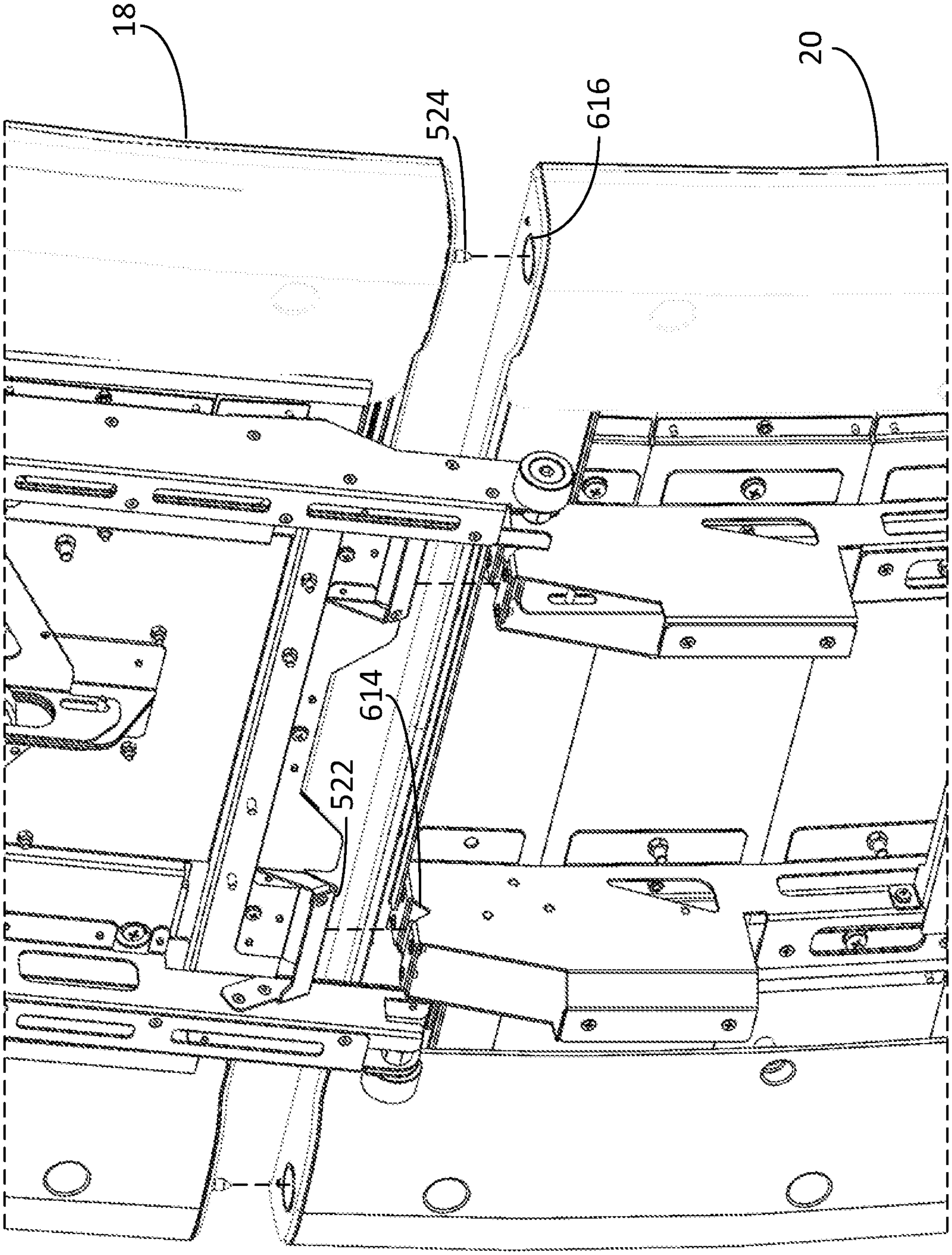
FIG. 12 is a back view of the interface between the upper and lower displays, according to one or more embodiments of the present disclosure.

FIGS. 9-12 depict an example display assembly configuration for mounting the displays to the gaming machine 10. More specifically, FIG. 9 depicts the upper display 18, FIG. 10 depicts a coupling assembly of the upper display 18, FIG. 11 depicts the lower display 20, and FIG. 12 depicts the interface between the upper display 18 and the lower display 20. In other embodiments, the displays 18, 20 may include additional, fewer, or alternative components in one or more suitable configurations, including those components and configurations described herein.

With respect to FIG. 9, in the example embodiment, the upper display 18 includes a pair of mounting brackets 502 with respective lower bearings 504, upper bearings 506, a display box 508, a bar 510, and a coupling assembly 512. In other embodiments, the upper display 18 may include additional, fewer, or alternative components, including those described elsewhere herein.

The bearings 504, 506 are configured to be moveably coupled to the rails 302, 304 (shown in FIG. 7) such that the display 18 can be moved along the path defined by the rails 302, 304. That is, the bearings 504, 506 are configured to ride within the rails 302, 304 to guide the movement of the display 18 as described herein. The bearings 504 extend outward from the mounting brackets 502 such that the mounting brackets 502 are not within the rails 302, 304. In other embodiments, the bearings 504 may be integrated with the mounting brackets 502, and the mounting brackets 502 are coupled within the rails 302, 304 to facilitate secure movement of the display 18. In certain embodiments, the wheel-styled bearings 504 and/or 506 may be replaced by other suitable bearings that facilitate movement, such as ball bearings.

The display box 508 is configured to operate the presentation by the upper display 18. That is, the display box 508 is configured to receive power and/or video data from the logic circuitry of the gaming machine 10 (e.g., the logic circuitry 40, shown in FIG. 2) and to cause the display 18 to present the display elements of the video data. The display box 508 may include one or more ports or cables for power and/or data communication. The display box 508 may also include cooling components (e.g., fans, heat sinks, etc.), power circuitry, microprocessors, and the like. It is to be understood that the display box 508 is not limited to a singular housing, but rather may be distributed in at least some embodiments.

The bar 510 is configured to provide a technician a place to grip the display 18 during the transport, mounting, and dismounting of the display 18. For example, during the mounting of the upper display 18 as described herein, the technician may grip at least the bar 510 to guide and align the mounting brackets 502 within the lower display support 204 (shown in FIG. 7). In the example embodiment, the mounting brackets 502 include a groove 514 adjacent the bearings 504. The groove 514 may be configured to couple with a corresponding component of the lower display support 204 that enables the entire upper display 18 to be rotated or pivoted around the groove 514. This enables the display 18 to be inserted at an angle and rotated into the lower display support 204, which enables the mounting process of the display 18 to be separated into a plurality of sequential tasks for the technician(s) as described herein rather than a plurality of tasks (e.g., alignment, securing the display 18 in the rails, lifting the display 18, etc.) that must be handled concurrently.

As described herein, the upper display 18 is configured to couple to a hook 704 (described further below) to facilitate transfer of the upper display 18 from the lower support 204 to the upper support 202 (shown in FIG. 7). In the example embodiment, the hook 704 is attached to the coupling assembly 512. FIG. 10 depicts a closer view of the coupling assembly 512. The coupling assembly 512 includes a loop 516, a sliding bracket 518, and a pair of extension members 520. The loop 516 is coupled to the hook 704 of a winch assembly 702. In the example embodiment, the coupling assembly 512 is configured to attach to the winch assembly 702 and provide an additional point of contact between the upper display 18 and the rails 302, 304, particularly while the upper display is moving. More specifically, as the upper display 18 is moved upwards as described herein via the rails 302, 304, the bearings 504, 506 act as the primary points of contact that prevent the display 18 from tipping forward away from the cabinet 12 due to the center of gravity on the display 18 and the direction of the upward force applied via the hook 704. However, when the bearings 504, 506 pass one or more of the openings 308, the bearings 504, 506 may not be secured within the rails 302, 304, thereby reducing the points of contact between the display 18 and each of the rails 302, 304 from two to one or none.

In the example embodiment, the extension members 520 are configured to be selectively positioned or deployed within the rails 302, 304 to act as an additional point of contact. The selective nature of the position of the extension members 520 may enable the upper display 18 to be mounted without requiring additional openings in the lower rail 304 to receive the upper display 18. To facilitate the selective deployment, the sliding bracket 518 is coupled between the loop 516 and the extension members 520 to cause the extension members 520 to move based on a force applied to the loop 516. That is, as the hook 704 engages and pulls on the loop 516, the sliding bracket 518 is configured to slide or move, thereby causing the extension members 520 to move from a disengaged position to an engaged position (i.e., a position that, when the display 18 is secured in the rails 302, 304, extends out into the rails 302, 304).

In the example embodiment, FIG. 10 depicts the extension members 520 in the retracted or disengaged position. That is, the extension members 520 are not extending outwards from the mounting brackets. In FIG. 9, the extension members 520 are in the extended or engaged position. To move from the disengaged position to the engaged position, the coupling mechanism 512 is configured to translate the force applied at the loop 516 by the hook 704 to movement of the extension members 520. The movement of the coupling assembly 512 in response to an upward force from the hook 704 is depicted by the arrows in FIG. 10. That is, the bracket 518 slides upwards, and the extension members 520 are coupled to the bracket 518 such that linear movement of the bracket causes the extension members 520 to rotate. The bracket 518 sliding upwards results in the extension members 520 rotating outwards to be external the mounting brackets 502 and within the rails 302, 304. Without any external force from the hook 704, the extension members 520 may be biased to the disengaged position. More specifically, the sliding bracket 518 may be biased to slide downwards without an external upwards force (e.g., from the hook 704), thereby moving the extension members 520 to the disengaged position. The bias may be a result of a gravitational force on the sliding bracket 518 and/or another suitable bias force, such as a spring or piston. In certain embodiments, the coupling assembly 512 may be configured to lock into the engaged or disengaged position until an external force (e.g., the pulling force from the hook 704) is applied.

In at least some embodiments, the coupling assembly 512 may include additional, fewer, or alternative components, including those described elsewhere herein. In one example, the upper display 18 and/or the supports 202, 204 may include an alternative means of securing the display 18 during movement, and therefore the coupling assembly 512 is just configured to secure to the hook 704. In another example, the extension members 520 may be integrated with the sliding bracket 518. In yet another example, the coupling assembly 512 may include springs, pistons, and/or other suitable mechanisms to facilitate the movements of the sliding bracket 518 and/or aid the hook 704 in securely moving the upper display 18.

With respect to FIG. 11, in the example embodiment, the display 20 may not include the same components for mounting as the upper display 18 because the lower display 20 does not require movement via the rails 302, 304 and the hook 704. More specifically, the lower display 20 includes a pair of shoulder brackets 602, a display box 604, a bar 606, a pair of hook brackets 608, a pair of box extensions 610, and a lip 612. In other embodiments, the lower display 20 may include additional, fewer, or alternative components, including those described elsewhere herein.

The shoulder brackets 602 extend outward from the back of the lower display 20 to facilitate load transfer to the lower display support 204. That is, the extension of the shoulder brackets 602 is configured to couple to one or more components of the lower display support 204 when the lower display 20 is installed in the gaming machine 10 such that at least a portion of the weight of the display 20 is transferred to the gaming machine 10. The shoulder brackets 602 and the lower display support 204 may further be configured to guide the lower display 20 into the installed position. This may be beneficial in environments in which technicians may be limited access to the sides of the gaming machine due to adjacent gaming machines and/or other structures.

In addition to load transfer and guided installation, the shoulder brackets 602 may facilitate coupling between the upper display 18 and the lower display 20. In the example embodiment, each shoulder bracket 602 includes a groove 614 for receiving a corresponding pin 522 (shown in FIGS. 9 and 12) from the upper display 18. The pins 522 is configured to rest within the grooves 614 when the displays 18, 20 are in the final deployed state (e.g., shown in FIG. 1). The interface between the grooves 614 and the pins 522 may facilitate load transfer from the upper display 18 to the shoulder brackets 602, which may then transfer the load to the lower display support 204. In certain embodiments, the pins 522 may be secured within the grooves 614 using any suitable mechanism for preventing the pins 522 from exiting the grooves 614 without engaging or disengaging the mechanism. In other embodiments, the pins 522 may be free to exit the grooves 614 to facilitate ease of moving the upper display 18 away from the lower display 20.

FIG. 12 depicts an example coupling interface between the upper display 18 and the lower display 20. In addition to or in place of the pins 522 of the upper display 18 configured to the rest in the grooves 614 of the lower display 20, the displays 18, 20 may include one or more other suitable interfaces. For example, the upper display 18 includes a pair of pegs 524, and the lower display 20 includes a respective pair of openings 616 configured to receive the pegs 524. This example interface may be used to aid alignment of the displays 18, 20 during the installation process described herein and to secure the interface between the displays 18, 20 from jostling, rotation, and/or other unwanted movement that may separate the displays 18, 20 from each other. In certain embodiments, the interface between the pegs 524 and the openings 616 may aid in load transfer between the upper display 18 and the lower display 20. In other embodiments, other suitable interfaces may be used in addition to or in place of the interfaces shown in FIG. 12. For example, the interfaces may be reversed such that the upper display 18 includes the grooves 614 and/or the openings 616 and the lower display 20 includes the corresponding pins 522 and/or pegs 524.

With respect again to FIG. 11, in the example embodiment, the display box 604 and the bar 606 may be substantially similar to the display box 508 and the bar 510 of the upper display 18. In other embodiments, the display box 604 and the bar 606 may have a different suitable configuration relative to the display box 508 and the bar 510 of the upper display 18 in consideration of the different mounted positions and interactions with the lower display support 204 of the two displays 18, 20. For example, the display box 604 may include data and/or power pass-through for the display box 508 of the upper display 18 such that the display box 508 is couples to the display box 604. The display box 604 may include additional ports and/or connectors to facilitate to the pass-through of power and/or data to and from the display box 508.

The hook brackets 608 extend below the lower display 20 to mount to the lower display support 204 (and/or a component below the lower display support 204) at the hook grooves 618. The hook brackets 608 enable the display 20 to be mounted to the lower display support 204 at an angle and rotated towards the lower display support 204 for installation around the hook grooves 618. The rotation provided by the hook brackets 608 may enable technicians to install the lower display 20 even with limited side access to the gaming machine 10. The bar 606 may be used by a technician to hold and guide the lower display 20 into the lower display support 204.

In the example embodiment, each hook bracket 608 extends through a respective box extension 610. The box extensions 610 extend from the back of the lower display 20. The box extensions 610 may be used as holding points on the lower display 20 for the technicians, and the box extensions 610 may be used to lock or secure the damping assembly 312 (shown in FIGS. 7 and 8). More specifically, with respect to FIGS. 8 and 11, the box extensions 610 on positioned on the lower display 20 to align with the rollers 408 of the damping assembly 312 when the lower display 20 is being mounted. The box extensions 610 engage the rollers 408 and push the arms 402 towards the back of the lower display support 204. In at least some embodiments, the arms 402 may be pushed back sufficiently to engage the locking mechanism 412, thereby securing the damping assembly 312 in a disengaged configuration. This may prevent the damping assembly 312 from providing an unwanted bias force on the displays 18, 20 and/or blocking the path of the upper display 18 during an uninstallation process (i.e., the reversal or partial reversal of the method 100).

The lip 612 extends from a lower or bottom edge of the lower display 20. In the example embodiment, the lip 612 is configured to engage a sealing assembly located below the lower display 20 that covers at least a portion of a gap between the bottom edge of the lower display 20 and the lower portion of the cabinet 12. The lip 612 and an example sealing assembly is described in detail in FIGS. 19A and 19B. In certain embodiments, particularly embodiments in which there is no sealing assembly or the sealing assembly does not rely upon interactions with the lower display 20, the lower display 20 may not include the lip 612.

In other embodiments, the lower display 20 may have the same or similar configuration as the configuration of the upper display 18 described above. For example, the lower display 20 may include the mounting brackets 502 and the bearings 504, 506 (but may not include the coupling assembly 512 because the lower display does not couple to the hook 704). The use of similar components between the two displays 18, 20 may facilitate intercompatability of replacement parts between the mounting mechanisms of the displays 18, 20.

With respect to FIGS. 4 and 7, after step 104, the upper display support 202 is in the upright position as shown in FIG. 7, and the gaming machine 10 is ready to begin the display installation process. At step 106, the upper display 18 is mounted into the lower display support 204. The mounting process may include inserting a lower end (e.g., the mounting brackets 502, shown in FIG. 9) into the lower openings 308 at an angle to facilitate mounting the display 18 with limited side access to the cabinet 12 of the gaming machine 10. The upper display 18 may then be coupled to one or more mechanisms configured to lift the display 18 to the upper display support 202 as described herein. In the example embodiment, at step 108, the upper display 18 is coupled to a winch assembly 702 (shown in FIG. 14) via a hook 704 of the winch assembly 702. In other embodiments, other suitable mechanisms for lifting the upper display 18 may be used in addition to or in place of the winch assembly 702. For example, the gaming machine 10 may include a conveyor assembly to lift the upper display 18.

Figure 13:
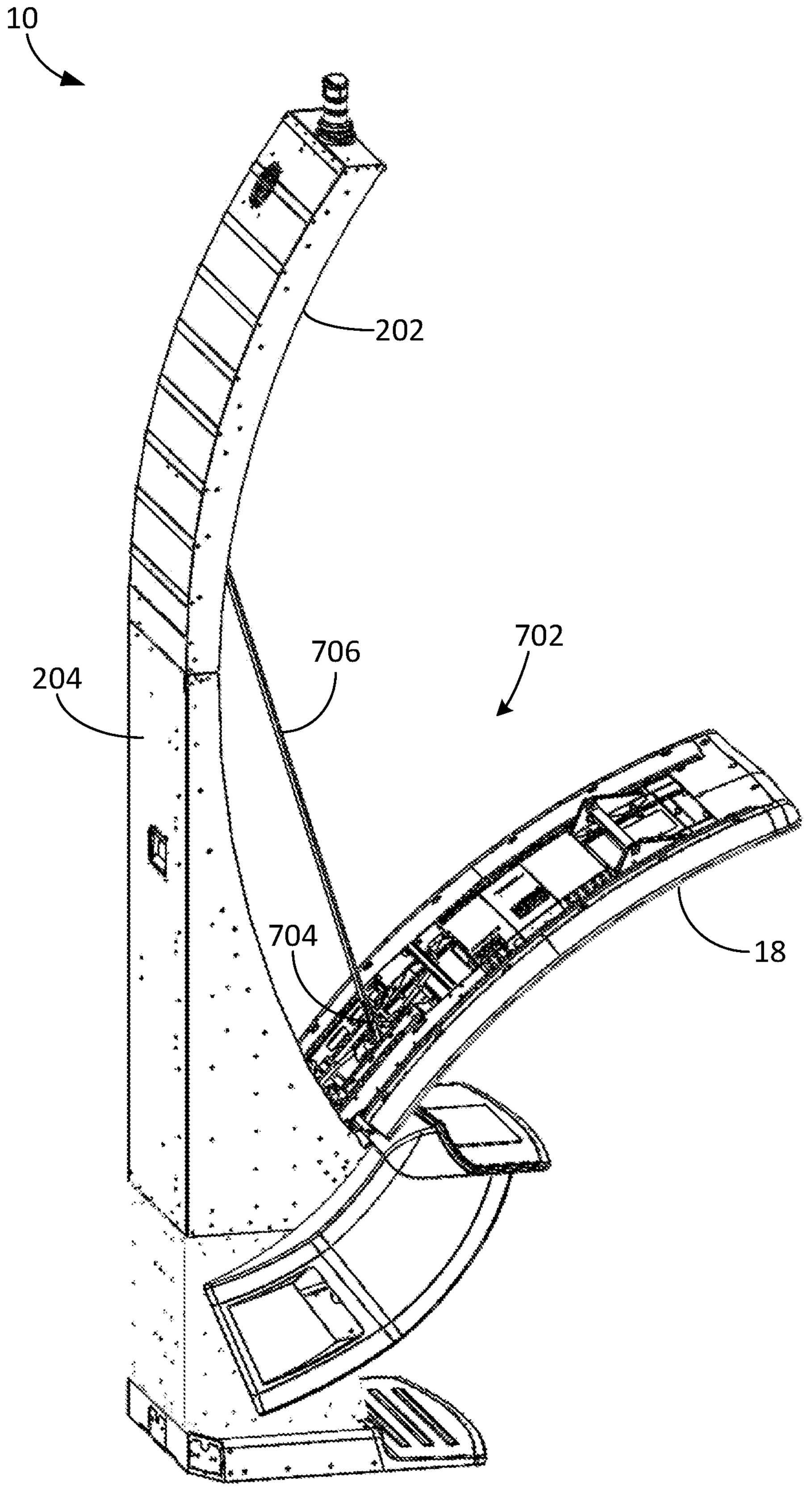
FIG. 13 is a back perspective view of the gaming machine shown in FIG. 1 with the upper display being mounted, according to one or more embodiments of the present disclosure.

FIG. 13 is a back perspective view of the upper display 18 being mounted and coupled to the winch assembly 702. In the example embodiment, the upper display 18 is coupled to the winch assembly 702 prior to fully rotating the display 18 to rest in the lower display support 204 to facilitate ease of access for the technicians coupling the display 18 and the winch assembly 702 together (i.e., access to the hook 704 and the coupling assembly 512 of the display 18 is needed). In other embodiments, the upper display 18 may be fully or partially rotated towards the lower display support 204 prior to coupling to the winch assembly 702 and/or another suitable lifting mechanism.

Figure 14:
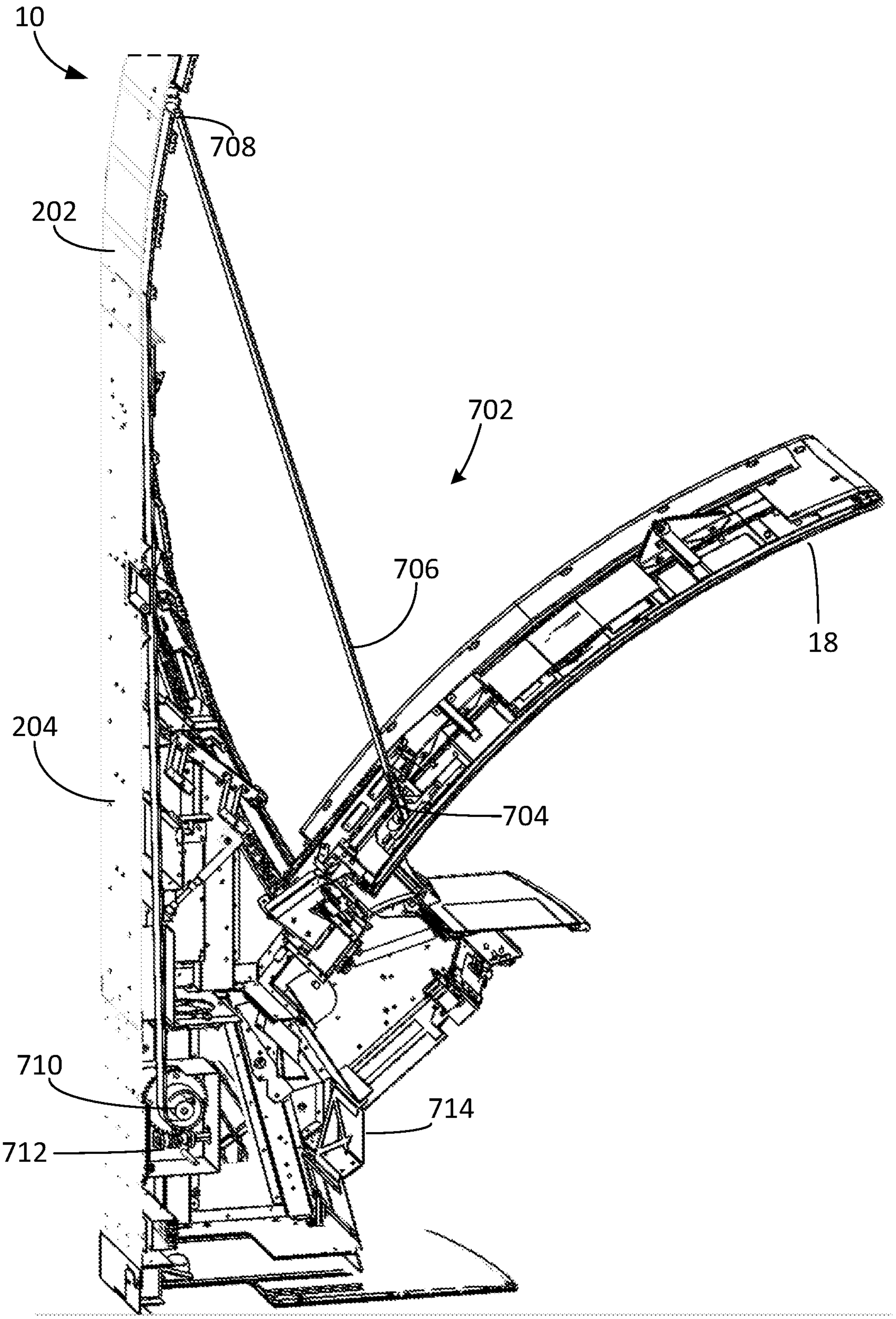
FIG. 14 is a vertical cross-section view of the gaming machine shown in FIG. 13.

FIG. 14 is a vertical cross-sectional view of the gaming machine 10 during the mounting of the upper display 18 similar to the state shown in FIG. 13. The cross-sectional view reveals the components of the example winch assembly 702. It is to be understood that at least a portion of the internal components of the gaming machine 10 have been removed (e.g., the logic circuitry, power supplies, etc.) for clarity purposes. In the example embodiment, the winch assembly 702 includes the hook 704, a strap 706, a pivot member 708, a spool 710, and a control interface 712. In other embodiments, the winch assembly 702 may include additional, fewer, or alternative components, including those described elsewhere herein.

As described previously with respect to FIG. 10, the hook 704 is configured to attach securely to the loop 516 of the coupling assembly 512. The hook 704 is the interface for applying the lifting force from the winch assembly 702 described herein to the upper display 18. In other embodiments, the winch assembly 702 may include other suitable connectors in place of the hook 704. In certain embodiments, the hook 704 may be part of a plurality of hooks configured to couple to the upper display 18.

In addition to coupling to the display 18, the hook 704 is coupled to the strap 706. The strap 706 is configured to extend from the spool 710 through the pivot member 708. More specifically, the strap 706 extends upwards from the spool 710 through a back spine of the display supports 202, 204 to the pivot member 708. The pivot member 708 is configured to enable the strap 706 to extend in a different direction (e.g., a substantially downward or outward direction). The strap 706 may be formed from any suitable material or combination of materials that has sufficient flexibility and load-bearing or load-transferring characteristics. These characteristics (including flexibility) may be a result of the material characteristics or the configuration of the strap 706. In certain embodiments, the winch assembly 702 may include a cable or other suitable mechanism in place of the strap 706. In other embodiments, the winch assembly 702 may include additional straps and/or other suitable mechanisms with the strap 706.

In the example embodiment, the pivot member 708 may be formed within the upper display support 202 and/or other component of the gaming machine 10 to receive the strap 706 and facilitate movement of the strap 706 through a gap defined by the pivot member 708. The pivot member 708 may simply be an opening defined within the upper display support 202 or one or more components positioned around the opening to facilitate movement of the strap 706. The pivot member 708 may be configured to protect the strap 706 from adjacent components and reduce the wear on the strap 706 (e.g., by including a groove or lip). In certain embodiments, the pivot member 708 may include a rotatable component, such as a wheel, movably coupled to the strap 706 to facilitate reduced component wear from the movement of the strap 706. In some embodiments, the strap 706 may be removed from the pivot member 708 during transportation and/or storage of the gaming machine 10 in the folded configuration. In the process of unfolding the upper display support 202, the hook 704 and the strap 706 may be threaded through the pivot member 708 to enable the functionality of the winch assembly 702 described herein.

The spool 710 is securely coupled to a proximal end of the strap 706 (where the distal end of the strap 706 is coupled to the hook 704) and is configured to wind and unwind the strap 706. More specifically, rotation of the spool 710 causes more or less of the length of the strap 706 to be wound around the circumference of the spool 710 based on the direction of rotation and the orientation of the portion of the strap 706 already wound around the spool 710. Increasing the length of the strap 706 wound around the spool 710 results in a decreased length of the strap 706 extending out from the pivot member 708. Conversely, decreasing the length of the strap 706 wound around the spool 710 results in an increased length of the strap 706 extending out from the pivot member 708. By rotating the spool 710 to adjust the height of the hook 704, the winch assembly 702 may lift or lower components attached to the hook 704 (i.e., the upper display 18).

To control the rotation of the spool 710, the winch assembly 702 may include one or more interfaces for the technicians to operate. In the example embodiment, the winch assembly 702 includes the control interface 712. The control interface 712 is a crank configured to receive a tool or other suitable instrument. The control interface 712 is configured to translate the movement, rotation, signal changes, and/or other suitable characteristics applied by the tool into rotating the spool 710. For example, the tool may be a hand-operated drill, and the control interface 712 includes an interface for receiving the drill and a gear system coupled between the spool 710 and the interface such that rotation of the interface is translated to rotation of the spool 710 via the gear system. In this example, the control interface 712 is accessible from the front of the gaming machine 10 through one or more removable panels 714 and with the use of a drill extension or extended head on the drill. After the technician has finished operating the winch assembly 702, the panels 714 may be replaced to prevent any unwanted access and operation of the winch assembly 702.

In some embodiments, the tool may be integrated with the control interface 712 (e.g., an integrated crank). In other embodiments, a motor may be used to operate the spool 710 either directly or through a corresponding control interface 712 (e.g., a gear system). The motor may be integrated with the gaming machine 10 or an external motor that is coupled to the winch assembly 702. The motor may be controlled by the technicians via inputs integrated in the motor or by command signals from a remote or computing device. It is to be understood that the configuration, orientation, and/or position of the control interface 712 may be adjusted to match the method in which technicians operate the winch assembly 702 (e.g., by hand, by tool, or by motor).

Figure 15:
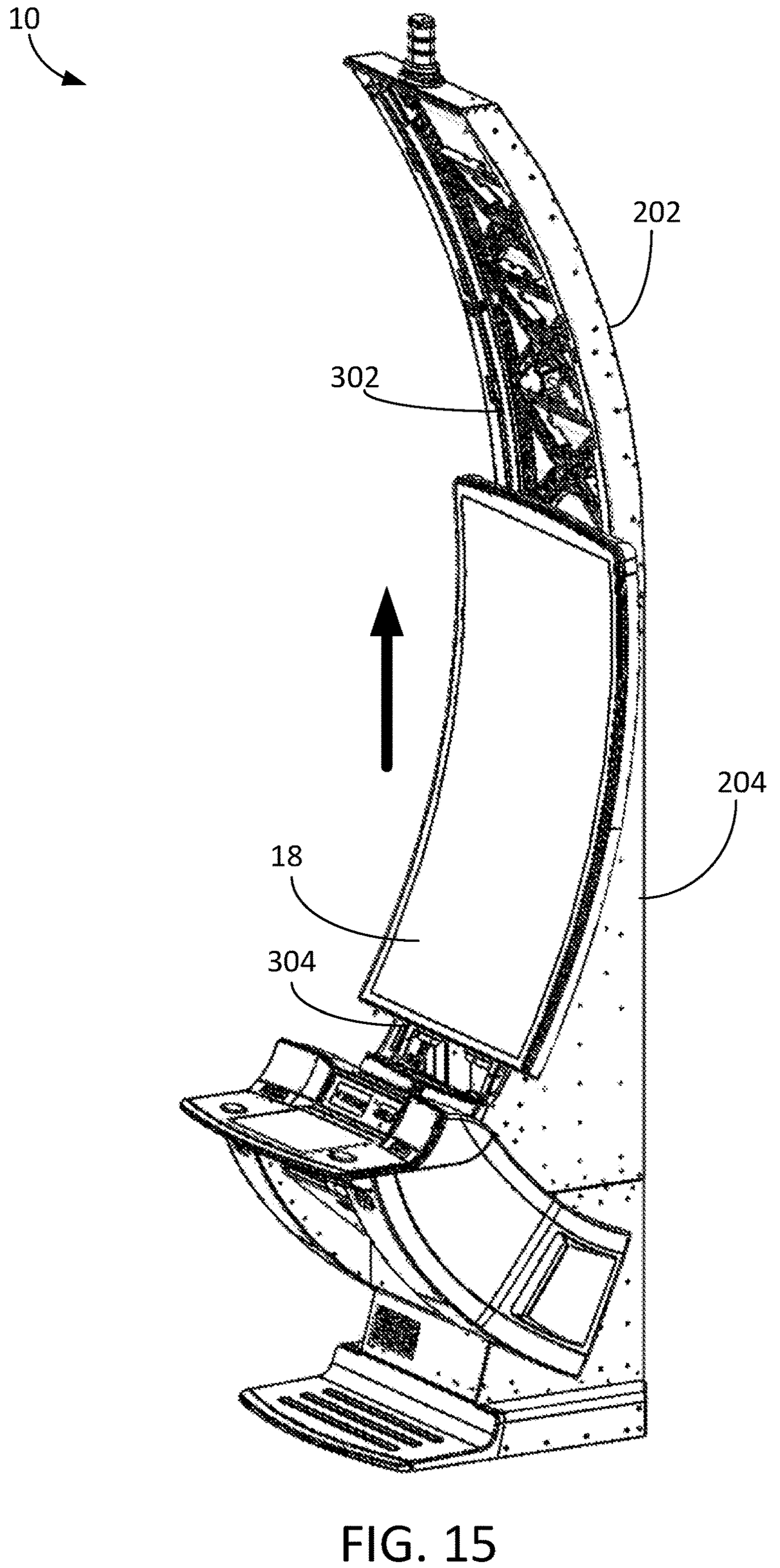
FIG. 15 is a perspective view of the upper display mounted onto the gaming machine shown in FIG. 1, according to one or more embodiments of the present disclosure.

In the example embodiment, at or after steps 104 and 106, the upper display 18 is rotated towards the lower display support 204. FIG. 15 is a perspective view of the gaming machine 10 with the upper display 18 resting in the lower display support 204. As described previously, the openings 308 (shown in FIG. 7) of the lower display support 204 are configured to receive the bearings 504, 506 (shown in FIG. 9) of the upper display 18. In this state, with the winch assembly 702 coupled to the upper display 18, the upper display 18 is ready to be lifted from the lower display support 204 to the upper display support 202.

Figure 16:
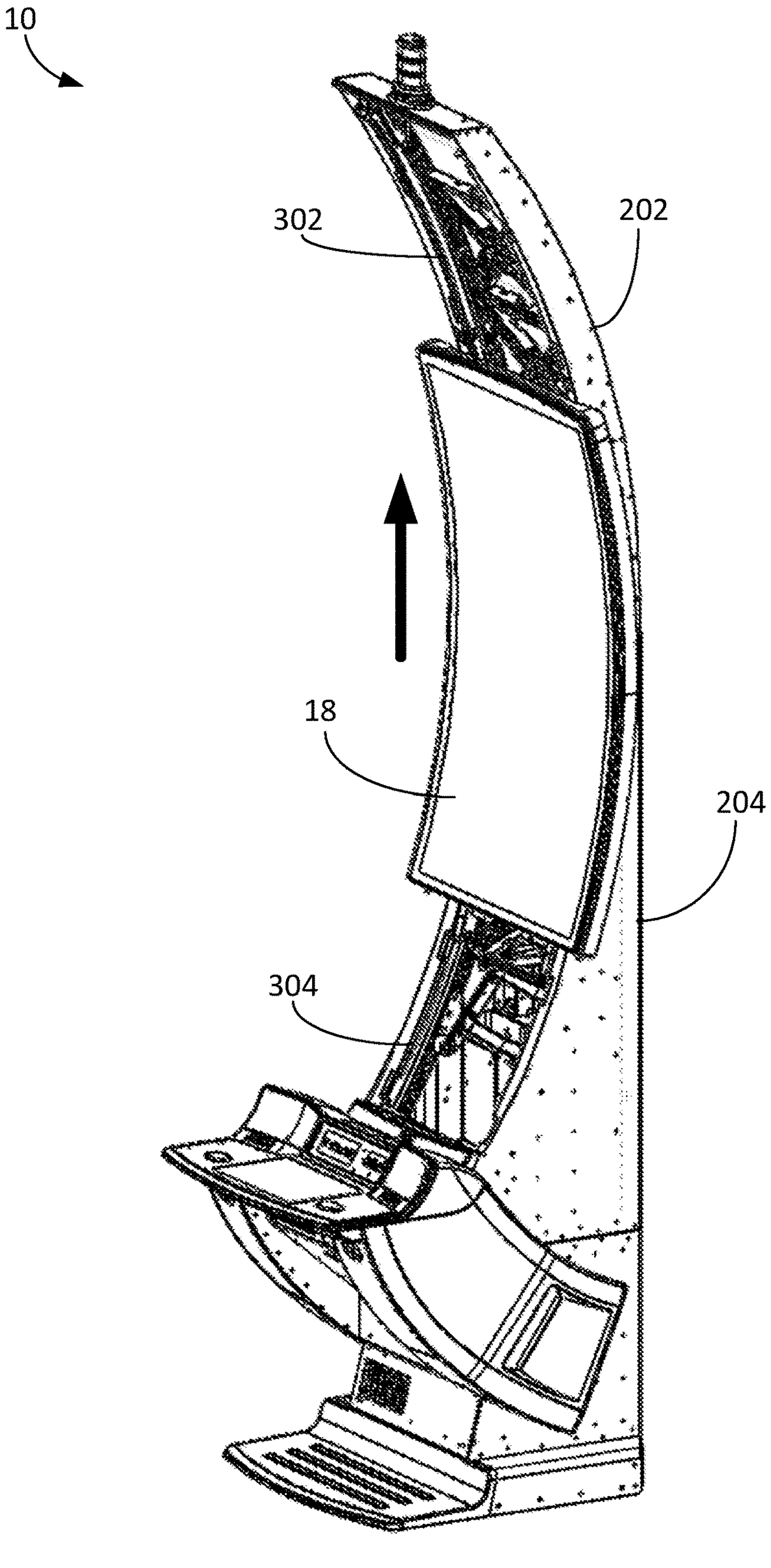
FIG. 16 is a perspective view of the upper display being lifted to an upper display support, according to one or more embodiments of the present disclosure.

At step 110, the winch assembly 702 is engaged to lift the upper display 18 to the upper display support 202. FIG. 16 depicts a perspective view of the gaming machine 10 with the upper display 18 being lifted. The rails 302, 304 (through the contact provided by the bearings 504, 506 and the extension guide members 520 shown in FIG. 9) guide the vertical movement of the display 18 to prevent the display 18 from tipping or moving outward from the display supports 202, 204 during movement. In some embodiments, the upper display 18 is lifted beyond a final installation point on the upper display support 202 to provide additional space for installing the lower display 20 as described herein. In other embodiments, the additional space may be unnecessary for the lower display 20, and the upper display 18 is lifted directly to the final installation point.

Figure 17:
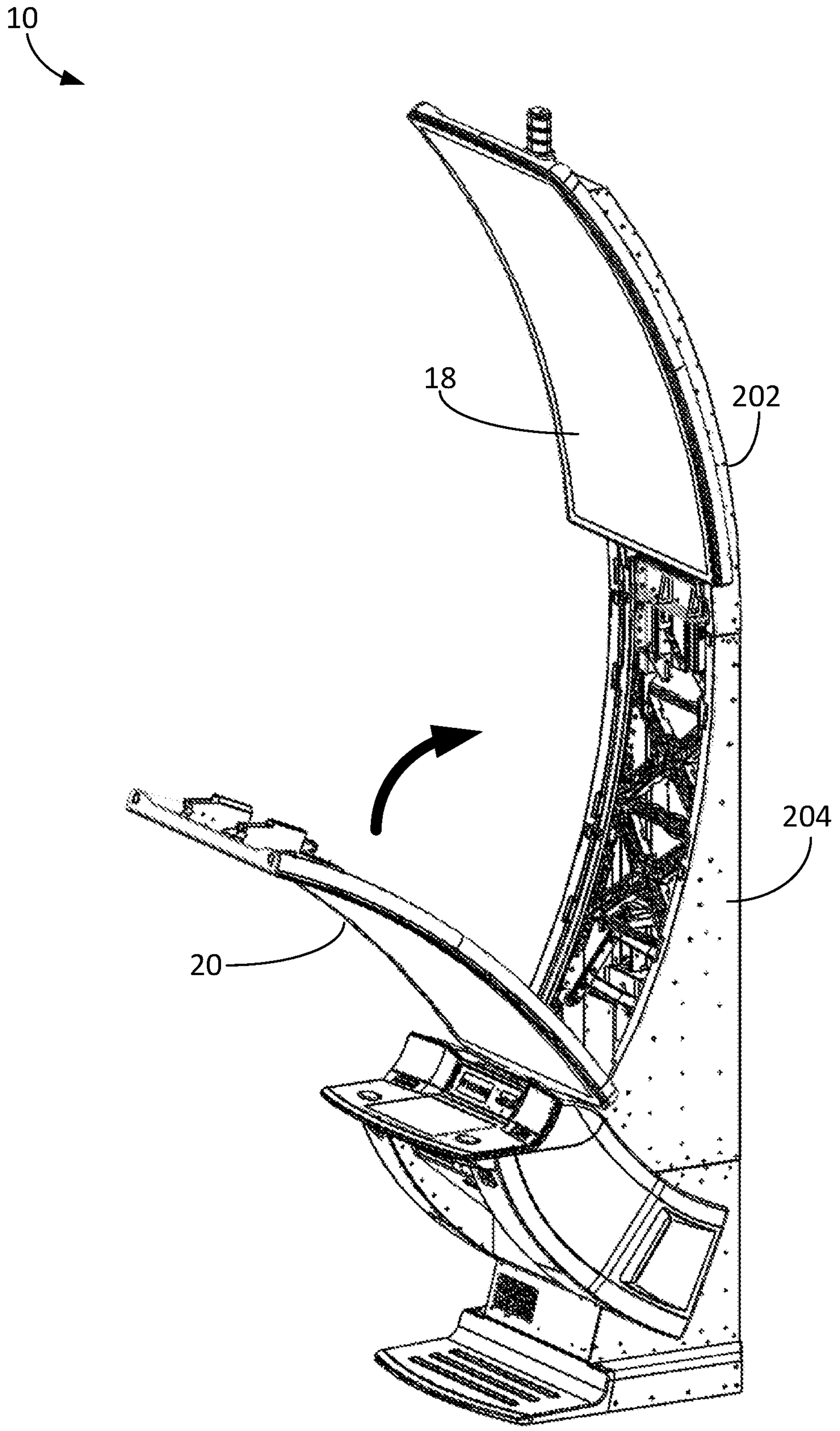
FIG. 17 is a perspective view of the gaming machine shown in FIG. 1 with the lower display being mounted, according to one or more embodiments of the present disclosure.

At step 112, the lower display 20 is mounted in the lower display support 204. FIG. 17 depicts a perspective view of the lower display 20 being mounted on the gaming machine 10. The mounting process for the lower display 20 may be similar to the mounting process for upper display 18. That is, the lower display 20 may be inserted in the lower display support 204 at an angle and is rotated backwards to the lower display support 204. As described above, the lower display 20 may not be coupled to the winch assembly 702 or the rails 302, 304 because the lower display 20 does not need to be lifted like the upper display 18. The lower display 20 may be secured in a final installation position through securely coupling to the upper display 18 (e.g., via the connection interface shown in FIG. 12), the lower display support 204, another suitable adjacent component of the gaming machine 10, and/or combinations thereof. This coupling may be disengaged to enable the lower display 20 to be removed during disassembly of the gaming machine 10.

In at least some embodiments, to facilitate the angled mounting of the displays 18, 20, the gap at the bottom of the lower display support 204 may be expanded. However, this gap may partially remain after the lower display 20 is installed, which may expose internal components of the gaming machine 10 to unwanted external access (e.g., a liquid spill and/or dust may travel through the gap to the internal components, potentially causing damage to the components). In such embodiments, the gaming machine 10 may include a sealing assembly that is adjustable to expand the gap for the displays 18, 20 during installation and seal the gap after the installation process. In one example, the sealing assembly is removable from below the lower display 20 such that the sealing assembly is installed with or after the lower display 20. In the example embodiment, the gaming machine 10 includes a rotatable sealing assembly. In other embodiments, other suitable sealing assemblies (including assemblies integrated with the lower display 20) may be used.

Figure 18A:
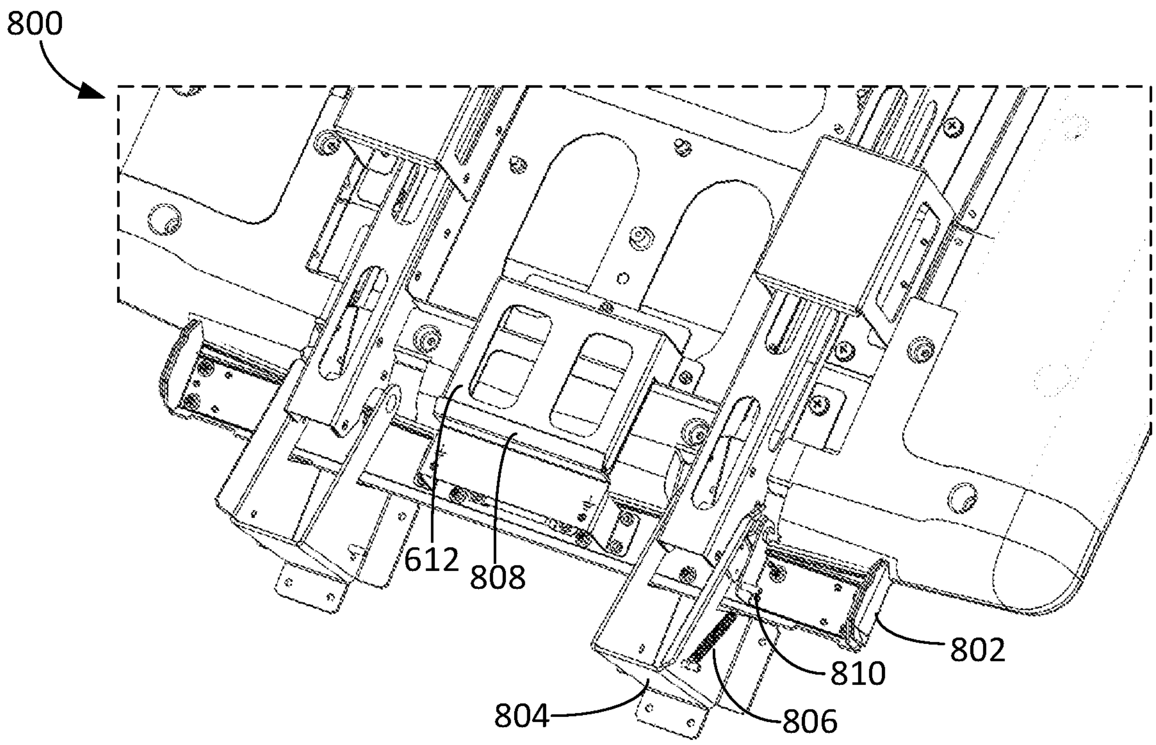
FIG. 18A is a perspective view of an example sealing mechanism for the gaming machine shown in FIG. 1 in an open or unsealed configuration, according to one or more embodiments of the present disclosure.
Figure 18B:
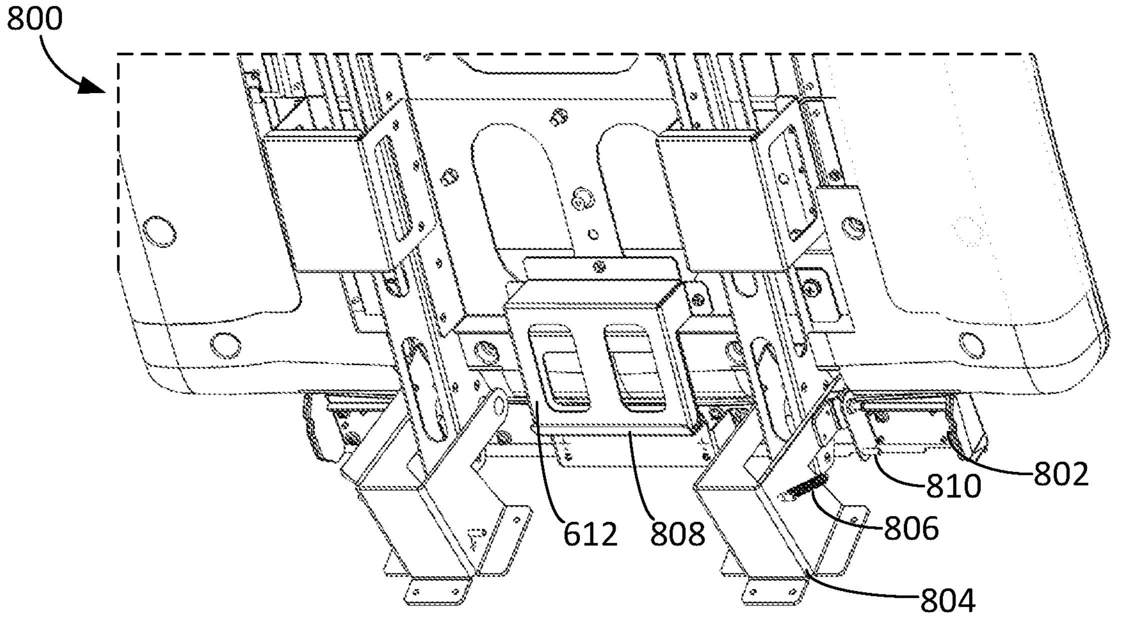
FIG. 18B is a perspective view of the sealing mechanism shown in FIG. 18A in a closed or sealed configuration, according to one or more embodiments of the present disclosure.

FIGS. 18A and 18B illustrate an example sealing assembly 800 that may be used with the gaming machine 10. More specifically, FIG. 18A illustrates the sealing assembly 800 in an open position and FIG. 18B illustrates the sealing assembly 800 in a closed position. The sealing assembly 800 may include a sealing member 802, pivot arms 804, one or more springs 806, and a catch member 808. In other embodiments, the sealing assembly 800 may include additional, fewer, or alternative components, including those described elsewhere herein.

The sealing member 802 is configured to extend along a lower edge of the lower display 20 when the lower display 20 is mounted. The sealing member 802 is configured to block the gap below the lower display 20. The sealing member 802 may be formed from any suitable material or combination of materials to prevent at least some internal access from the gap. In one example, the sealing member 802 may include a flexible skirt or border surrounding a solid internal body such that the skirt is compressible between the solid body and any adjacent components in the closed position to seal the gap. In another example, the sealing member 802 may include grills, grates, or other suitable openings for ventilation, speakers, lighting assemblies, and the like. These openings may include mesh or other filters to prevent dust and/or liquid from entering the openings.

In the example embodiment, the sealing member 802 is a single body component formed from a metal, plastic, and/or other suitable material. The width of the sealing member 802 may be greater than, lesser than, or the same as the width of the lower edge of the display 20. In the example embodiment, the lower display 20 extends beyond the width of the lower display support 204, so the sealing member 802 has a width to match the gap of the lower display support 204.

The sealing member 802 is coupled to a pair of pivot arms 804. In other embodiments, the sealing assembly 800 may include other suitable numbers and configurations of pivot arms 804. The pivot arms 804 are fixed members extending from the cabinet 12 (or another suitable structure of the gaming machine 10). In the example embodiment, the pivot arms 804 are formed in an L-shape at an angle to accommodate the rotation of the sealing assembly 800 and the curvature of the cabinet 12. A distal end of the pivot arms 804 is configured to couple to the sealing member 802 and as well as operate as the pivot point for both the mounting brackets 502 of the upper display 18 and the hook brackets 608 of the lower display 20. That is, at the distal end of the pivot arms 804, the corresponding brackets of the displays 18, 20 are inserted and then rotated around to mount the displays 18, 20 to the lower display support 204. In at least some embodiments, the proximal end at which the pivot arms 804 are secured to the cabinet 12 or other structural component may be configured to transfer at least a portion of the load on the pivot arms 804 from the displays 18, 20 to elsewhere on the gaming machine 10.

The sealing member 802 is rotatable around the distal end of the pivot arms 804 from an open position (for receiving displays) to a closed position (for sealing the gap below the lower display 20). It is to be understood that the sealing member 802 may be rotatable to a plurality of other positions, including positions between the open and closed position and positions outside of the open and closed positions (though other adjacent components may limit this movement). To aid the technicians in the installation and disassembly processes, the sealing member 802 may be configured to be biased to the open position. In the example embodiment, the spring 806 may be coupled between the pivot arm 804 and the sealing member 802 at a pin 810 (the spring 806 is not attached to the pin 810 in FIGS. 18A and 18B for clarity purposes). More specifically, the spring 806 applies a bias force backwards on a lower edge of the sealing member 802, which biases the sealing member 802 to rotate to the open position shown in FIG. 18A. This bias force may be calibrated such that the force is sufficient to move the sealing member 802 to the open position when no other substantive forces are applied to the sealing assembly 800, but insufficient to prevent the sealing member 802 from moving to the closed or sealed position in response to an external force as described herein. In certain embodiments, the sealing assembly 800 may include other suitable mechanisms for applying bias forces, such as a piston.

In at least some embodiments, the sealing assembly 800 is configured to remain in the open position or configuration through the installation of the upper display 18 to facilitate the subsequent installation of the lower display 20. To achieve this function, the sealing assembly 800 may either include a manually operated mechanism for rotating the sealing assembly 800, or the sealing assembly 800 may include one or more components that interact with the lower display 20 but not with the upper display 18. In the example embodiment, the catch member 808 and the lip 612 are configured to control the movement of the sealing assembly 800. The catch member 808 is an extension coupled to the sealing member 802 that extends off a back surface of the sealing member 802. The lip 612 extends outward and downward to contact the catch member 808, particularly while the hook brackets 608 are coupled to the pivot arms 804. As the technicians rotate the display 20, the lip 612 applies a force to the catch member 808 and, by extension, the sealing member 802. This force may be sufficient to overcome the bias force of the spring 806, and therefore the sealing member 802 rotates from the open position to the closed position. In some embodiments, similar to the damping assembly 312 shown in FIG. 8, the sealing assembly 800 may include a locking mechanism to secure the sealing member 802 in the closed position. In other embodiments, the force from the lip 612 remains applied to the catch member 808 to maintain the sealing member 802 in the closed position until the lower display 20 is removed from the gaming machine 10.

Figure 19:
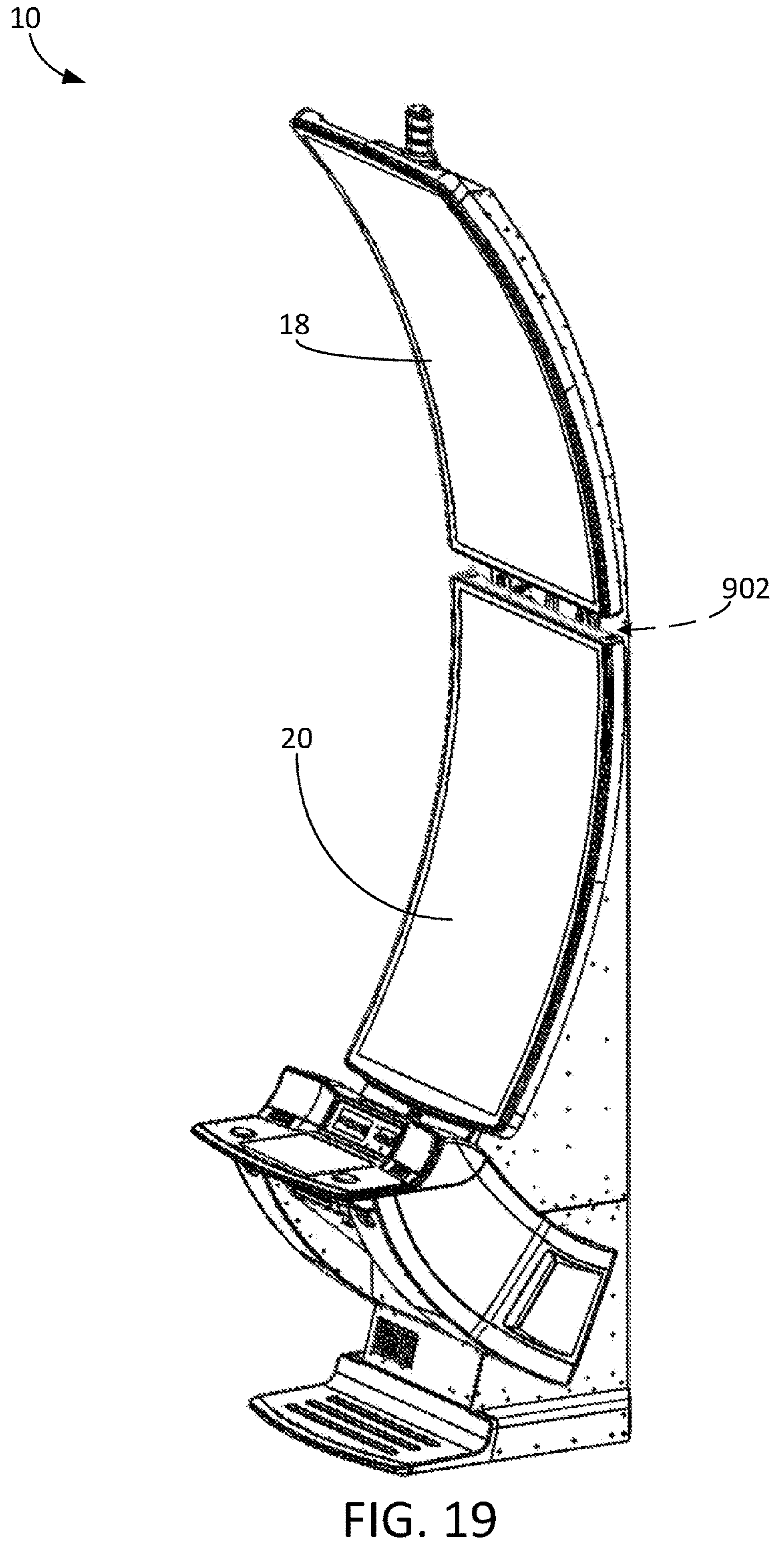
FIG. 19 is a perspective view of the gaming machine shown in FIG. 1 with the lower display mounted and the upper display in an extended position, according to one or more embodiments of the present disclosure.

FIG. 19 is a perspective view of the gaming machine 10 with the lower display 20 installed and the upper display 18 raised to create a gap 902. The gap 902 may provide space for technicians to mount the lower display 20 and to make sure that any cables and the like are not positioned improperly (e.g., tangled together). At this point of the installation process, at step 114, the upper display 18 may then be lowered using the winch assembly 702 to a final installation point as shown in FIG. 1. As shown in FIG. 12, the displays 18, 20 may interface with one another to prevent the displays 18, 20 from being improperly removed or dislodged from the installation positions.

The installation process described above may, in at least some embodiments, occur at or near a final deployed location of the gaming machine 10 such that the gaming machine 10 may be ready for conducting and/or presenting games (e.g., casino wagering games) after the installation. To move the gaming machine 10, the gaming machine 10 may either remain in the deployed, upright configuration shown in FIG. 1 or returned to the transportation state shown in FIG. 6. To uninstall the gaming machine 10 in the transportation state, the method 400 may be followed in reverse order of steps. As an example, the upper display 18 may be lifted to facilitate removal of the lower display 20, and then the upper display 18 is lowered to be removed from the gaming machine 10. The technicians may be required to manually disengage one or more locks, fasteners, and/or other mechanisms that hold the gaming machine in the deployed configuration to remove the displays 18, 20 and fold the upper display support 202. For example, fasteners may be coupled at or near the hinge 206 to prevent the upper display support 202 from rotating, and these fasteners may be removed during the uninstall process.

In at least some embodiments, the gaming machine 10 may include one or more features to prevent unauthorized removal of the upper display 18 while the gaming machine 10 is deployed in a gaming environment. That is, one or more unauthorized users (or a user following an improper method of uninstalling the upper display 18 from the gaming machine 10) may attempt to lift the upper display 18 off the lower display 20 and/or disengage the hook 704. To prevent or limit such action, the gaming machine 10 may include one or more features the prevent improper lifting and remove of the upper display 18. In the example embodiment described herein, the upper display 18 includes a latching mechanism that selectively engages a corresponding feature of the gaming cabinet 12 to limit movement of the upper display 18.

Figure 20A:
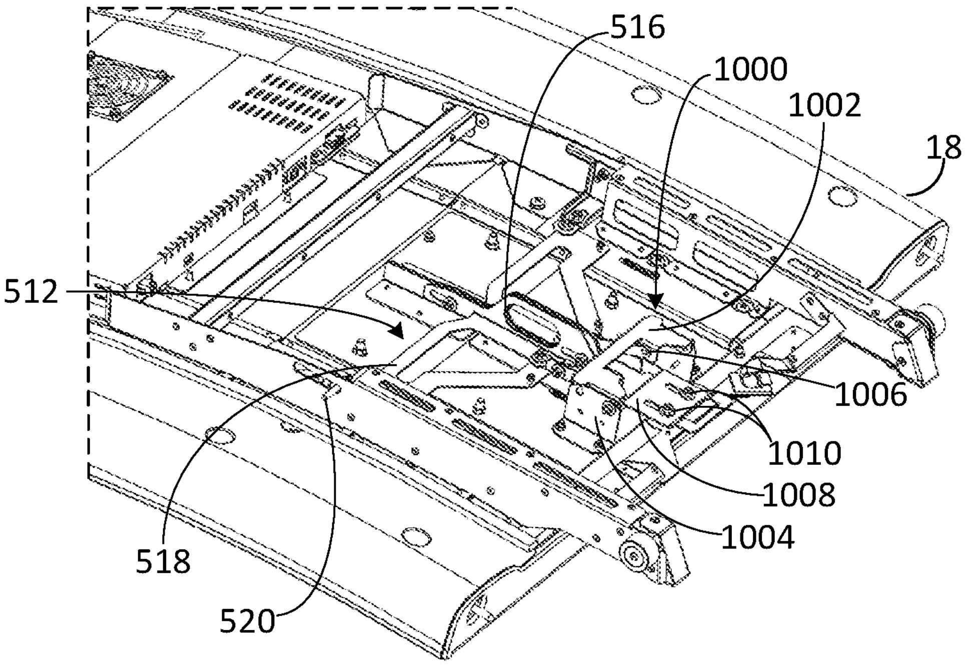
FIG. 20A is a perspective view of the upper display with an example latching mechanism in a disengaged state, according to one or more embodiments of the present disclosure.
Figure 20B:
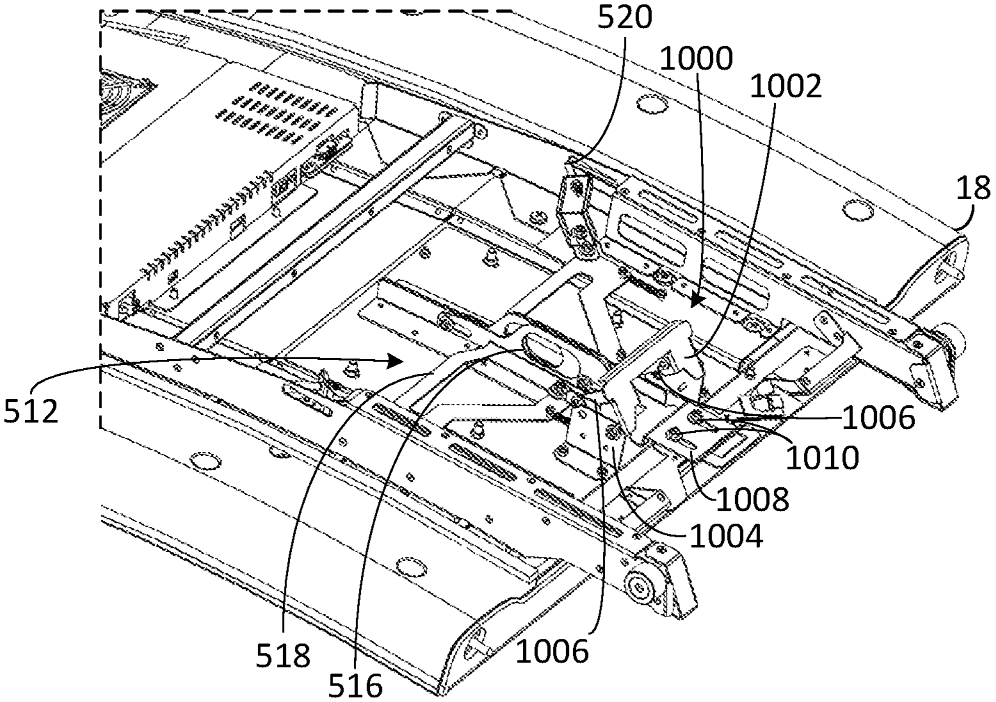
FIG. 20B is a perspective view of the latching mechanism of FIG. 20A in an engaged state, according to one or more embodiments of the present disclosure.

FIGS. 20A and 20B depict perspective rear views of the upper display 18 with an example latching assembly 1000 for securing the upper display 18 as described herein. More specifically, FIG. 20A depicts the latching assembly 1000 in a disengaged state, and FIG. 20B depicts the latching assembly 1000 in an engaged state. In the example embodiment, the latching assembly 1000 is positioned near the lower end of the upper display 18 and coupled to coupling assembly 512. The coupling assembly 512 is configured to affect the state of the latching assembly 1000. That is, the state of the coupling assembly 512 as described in FIG. 10 affects the position or state of the latching assembly 1000 as described herein. The latching assembly 1000 includes a latch member 1002, pivot members 1004, a pair of arm members 1006, bracket member 1008, and fasteners 1010. In other embodiments, the latching assembly 1000 may be located at a different position on the upper display 18, coupled to the coupling assembly 512 in another suitable configuration, and/or include additional, fewer, or alternative components, including those described elsewhere herein. In certain embodiments, the latching assembly 1000 may be included in the upper display support 202 (shown in FIG. 6) to interact with a corresponding feature of the upper display 18.

The latch member 1002 is configured to selectively extend outward from the upper display 18 towards the upper display support 202 when the upper display 18 is installed on the gaming machine 10 as described herein. In the example embodiment, the latch member 1002 has a handle-like structure with a proximal end coupled to the pivot members 1004 in a rotatable configuration and a distal end that extends outward from the upper display 18. It is to be understood that, in this context, extending "outward" from the upper display 18 does not necessarily indicate the latch member 1002 is extending orthogonal from the back of the upper display 18, but rather may extend in a range of directions from the upper display. For example, the disengaged state shown in FIG. 20A includes the latch member 1002 in a substantially flat configuration, while the engaged state shown in FIG. 20B includes the latch member 1002 pivoted away from the upper display 18 at an angle. In other embodiments, the latch member 1002 may have a different structure and/or configuration according to specific structure and configuration of the upper display 18 and the upper display support 202. For example, the latch member 1002 may extend through other suitable mechanical or electrical means in certain embodiments.

In the example embodiment, to pivot the latch member 1002, the latch member 1002 is coupled to the coupling assembly 512 such that movement of the coupling assembly 512 causes the latch member 1002 to move between the disengaged and engaged states. The latch member 1002 may be coupled to the loop 516 and/or the sliding bracket 518 where movement of the loop 516 and the sliding bracket 518 is translated into the latch member 1002 pivoting around the pivot members 1004. In the example embodiment, the arm members 1006 are coupled between the latch member 1002 and the sliding bracket 518 to translate the movement of the sliding bracket into rotation of the latch member 1002. More specifically, the arm members 1006 are coupled to the sliding bracket 518 at a proximal end and to the latch member 1002 at a distal end. Moving the proximal end of the arm members 1006 via the sliding bracket 518 not only displaces the proximal end, but also the distal end as can be seen by the difference in the position of the latch member 1002 and the arm members 1006 in FIGS. 20A and 20B. In the example embodiment, the arm members 1006 extend from the proximal end at an angle from an imaginary plane extending through the proximal end along the back of the upper display 18. The angle increases as the proximal end moves towards the latch member 1002, thereby forcing the latch member 1002 upwards or away from the upper display 18 (i.e., in the engaged state). Conversely, as the proximal end of the arm members 1006 moves away from the latch member 1002, the angle decreases, thereby pulling the latch member 1002 towards the upper display 18 (i.e., the disengaged state).

The latch member 1002 may be biased, through either the coupling assembly 512 or the latching assembly 1000, to the engaged or disengaged state when no force is applied by the hook 704 (shown in FIG. 9). In the example embodiment, as can be seen by the relative positions of the loop 516 in FIGS. 20A and 20B, the latch member 1002 is biased in the engaged state. From the biased, engaged state, applying a force via the hook 704 moves the latch member 1002 to the disengaged state. As the force applied by the hook 704 decreases (e.g., the upper display 18 is improperly lifted, thereby introducing slack on the winch assembly 702, shown in FIG. 13), the bias may cause the latch member 1002 to transition from the disengaged state to the engaged state. The bias force may be applied to the latch member 1002 via one or more springs or other bias members of the latching assembly 1000. In one example, the latching assembly 1000 includes one or more springs coupled to the sliding bracket 518 and the latch member 1002 (or the mechanism causing the latch member 1002 to rotate) such that a bias force is applied to cause the latch member 1002 to move to and remain in the disengaged state. The bias force may be sufficient to cause the movement of the latch member 1002 but less than a typical force applied by the hook 704, thereby enabling the latch member 1002 to transition to and remain in the disengaged state as described herein. It is to be understood that although the state of the latch member 1002 is referred to herein as one of two states ("engaged" and "disengaged"), it is to be understood that a range of intermediate positions between (and positions beyond) the illustrated positions of the latch member 1002 may be considered within the scope of the two states described herein.

In at least some embodiments, the bracket member 1008 and the fasteners 1010 are provided to secure the latching assembly 1000 and limit the movement of the latch member 1002. That is, the fasteners 1010 occupy internal gaps or slots defined by the bracket member 1008. The bracket member 1008 is coupled to the latch member 1002 and/or the coupling assembly 512 such that the bracket member 1008 moves with the latch member 1002 and/or the coupling assembly 512. In certain embodiments, the bracket member 1008 may be integrated with the coupling assembly 512 (e.g., the sliding bracket 518). The fasteners 1010 are configured to limit the movement of the bracket member 1008 based on the length of the slots. Limiting the movement of the bracket member 1008 may also limit the movement of the latch member 1002 and/or the coupling assembly 512 within a predefined range of positions to prevent the latch member 1002 and/or the coupling assembly 512 from engaging or disengaging improperly and catching onto another component of the gaming machine 10.

Figure 21:
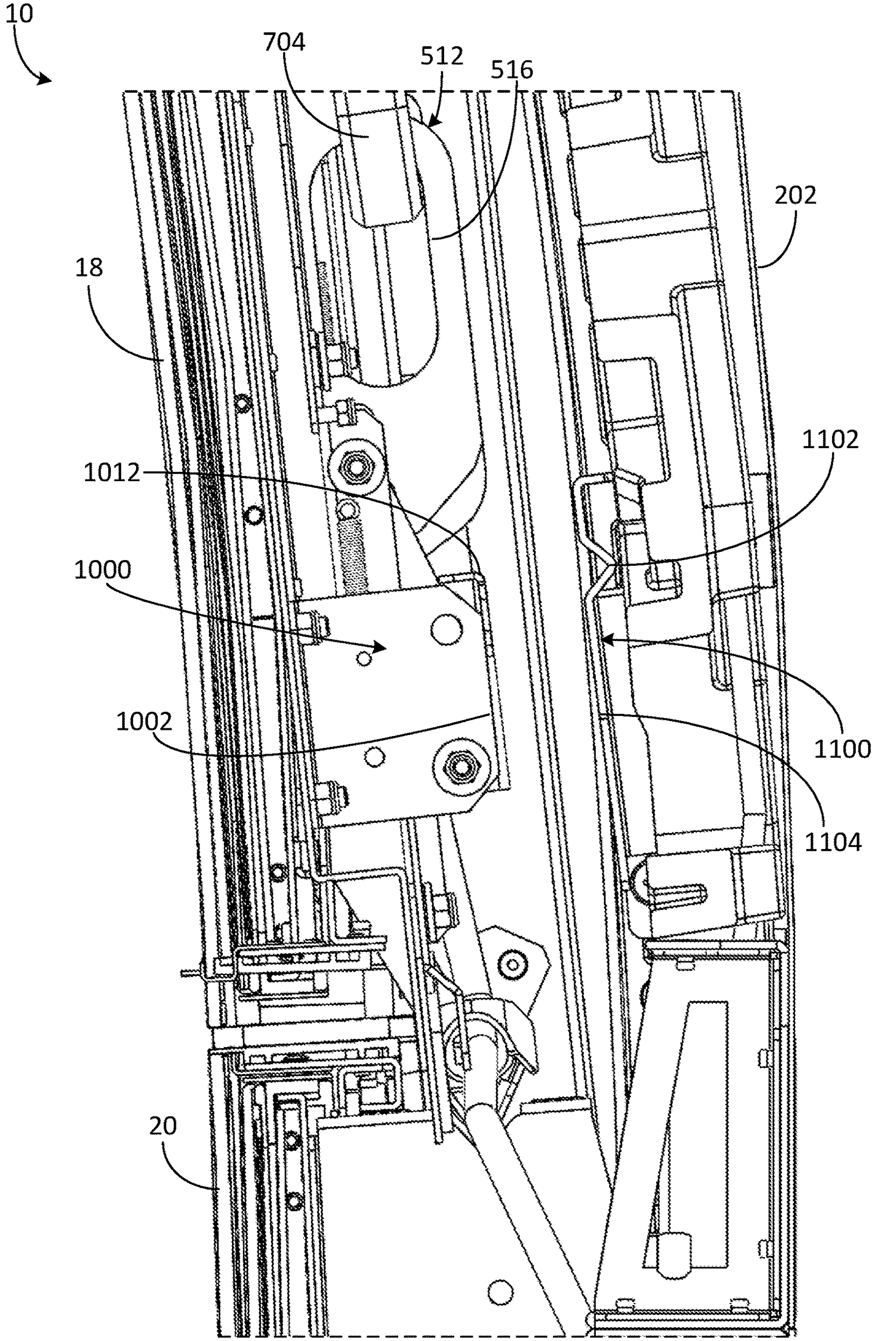
FIG. 21 is a vertical cross-sectional view of the gaming machine with the example latching mechanism of FIG. 20A in the disengaged state, according to one or more embodiments of the present disclosure.
Figure 22:
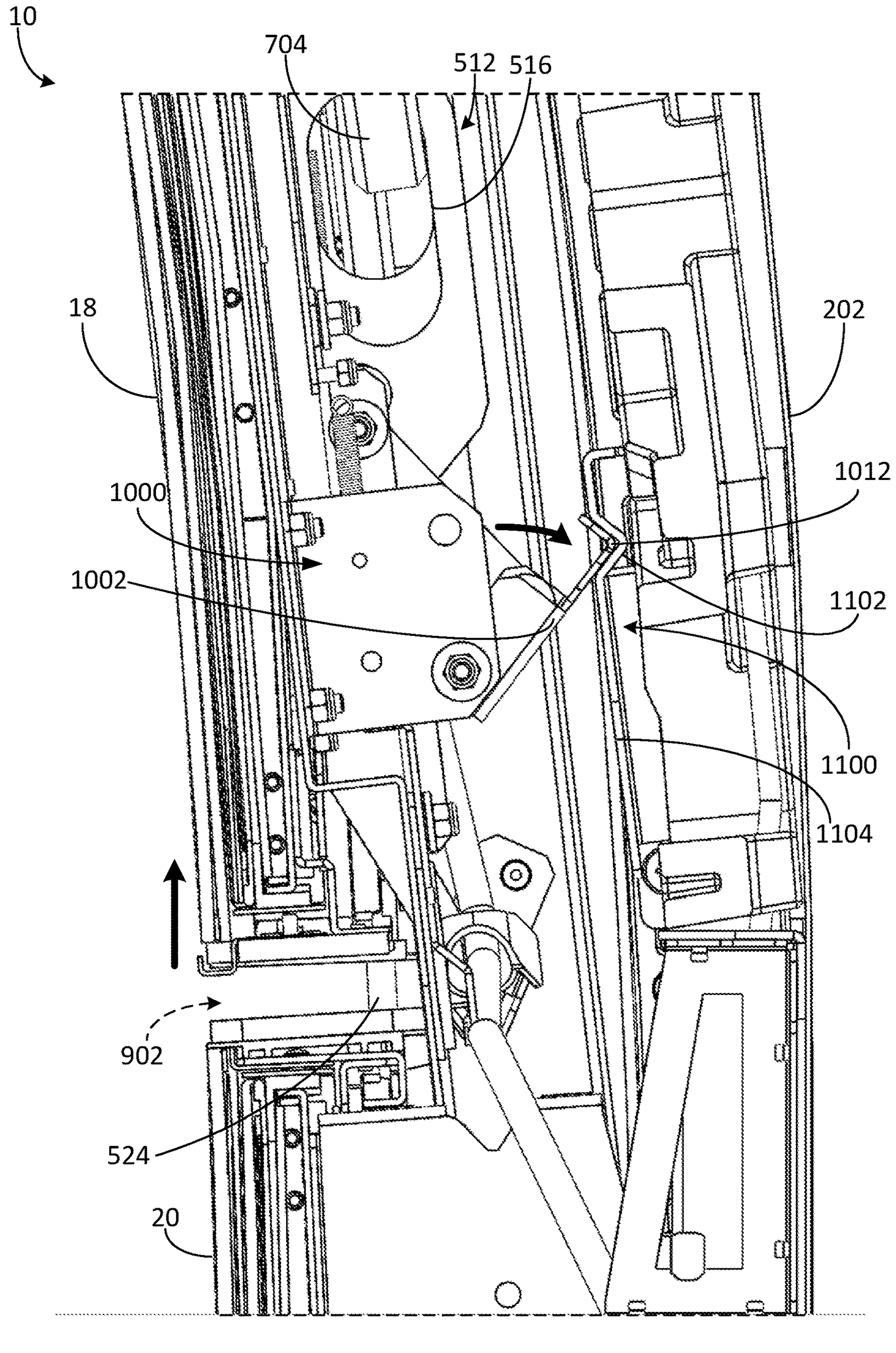
FIG. 22 is a vertical cross-sectional view of the gaming machine with the example latching mechanism of FIG. 20B in the engaged state, according to one or more embodiments of the present disclosure.

FIGS. 21 and 22 depict vertical cross-sectional views of the gaming machine 10 with the upper display 18 and the upper display support 202. More specifically, FIG. 21 depicts the upper display 18 in the installed state shown in FIG. 1, and FIG. 22 depicts the upper display 18 being improperly lifted from the upper display support 202. With respect to FIG. 21, the hook 704 may continue to apply a force to the loop 516 of the coupling assembly 512, which causes the latch member 1002 to remain in the disengaged state. In the disengaged state, the latch member 1002 may remain substantially flat against the upper display 18 to avoid catching any other components of the gaming machine 10. In other embodiments, the latch member 1002 may not be configured to be flat against the upper display 18 in the disengaged state but is in a different suitable configuration that avoids catching other components or limiting the movement of the upper display 18.

In a proper uninstallation process, the latch member 1002 may remain in the disengaged state until the hook 704 is removed from the coupling assembly 512 (i.e., at the state shown in FIG. 13) because of the force applied by the hook 704. However, improper lifting of the upper display 18 from the upper display support 202 may introduce slack in the winch assembly 702, which reduces the force applied by the hook 704. As a result, the latch member 1002 may transition to or towards the engaged state.

In the example embodiment, the upper display support 202 includes a security bracket 1100 to interface with the latch member 1002. The security bracket 1100 is positioned and configured to engage the latch member 1002 when the latch member 1002 is in the engaged state. As mentioned above, the "engaged state" may be defined as any position or orientation of the latch member 1002 that engages the security bracket 1100 as described herein. Similarly, the "disengaged state" may be defined as any position or orientation of the latch member 1002 that would not engage the security bracket 1100. The security bracket 1100 may have the same or similar width as the latch member 1002. In other embodiments, the security bracket 1100 may have a smaller or wider width relative to the latch member 1002.

As seen in the transition from FIG. 21 to FIG. 22, the upper display 18 is lifted to expose the gap 902 (also shown in FIG. 19) and introduce slack in the winch assembly 702. The slack in the winch assembly 702 reduces the force applied to the coupling assembly 512, thereby causing the sliding bracket 518 to move and push the latch member 1002 into the engaged state. In the engaged state, a leading or distal edge 1012 of the latch member 1002 contacts the security bracket 1100. In certain embodiments, slack may be already be present in the winch assembly within the installed state, and the distal edge 1012 may already be positioned at or near the security bracket 1100 prior to improper movement of the upper display 18.

As the upper display 18 is lifted upwards, the distal edge 1012 slides into a catch member 1102 of the security bracket 1100. The catch member 1102 may be an integrated indent in the bracket 1100 and/or include other suitable features for engaging and/or securing the distal edge 1012 of the latch member 1002. In the example embodiment, the catch member 1102 is sized to accept the distal edge 1012 to distribute the upward force from lifting the upper display 18 through the bracket 1100 and the frame of the gaming machine 10, thereby preventing additional upward movement. In at least some embodiments, the distal edge 1012 is configured to contact a body 1104 of the security bracket 1100 below the catch member 1102 and slide into the catch member 1102 due to the upwards movement of the upper display 18 and the rotation of the latch member 1002. In other embodiments, the positioning of the catch member 1102 relative to the distal edge 1012 may be calibrated to cause the distal edge 1012 to enter the catch member 1102 directly.

The latching assembly 1000 and the security bracket 1100 may be configured and/or positioned to limit the movement of the upper display 18 within a predefined range of upward movement. The movement of the upper display 18 may be limited to a point such that the pins 524 of the upper display are not fully removed from the openings 616 (shown in FIG. 12) of the lower display 20. As a result, the pins 524 may prevent or limit improper lateral movement of the upper display 18. In at least some embodiments, the latch member 1002 in the engaged state may limit external access to the hook 704 to prevent the hook 704 from being removed.

As the upper display 18 is returned to the intended, installed position, the distal edge 1012 of the latch member 1002 may recede from the catch member 1102. That is, as the upper display 18 is lowered, slack is removed or reduced from the winch assembly 702, thereby introducing a force on the coupling assembly 512 and moving the latch member 1002 towards the disengaged state. The distal edge 1012 may continue to contact and slide upon the security bracket 1100 in the engaged state until the force from the hook 704 is sufficient to move the latch member 1002. In other embodiments, the latch member 1002 may be configured to rotate towards the disengaged state as the upper display 18 is lowered, thereby causing the distal edge 1012 to move away from the security bracket 1100 as the distal edge 1012 exits the catch member 1102.

In certain embodiments, the gaming machine 10 may include one or more sensors and/or other components or software for detecting the improper lifting of the upper display 18. In one example, contact between the latch member 1002 and the catch member 1102 may trigger a sensor alert. In another example, the power and/or data cables may be configured to disconnect when the upper display is lifted, and the logic circuitry (e.g., the logic circuitry 40, shown in FIG. 2) may detect the disconnect with the upper display 18. In a further example, accelerometer sensors may be included with the upper display 18 to detect movement of the display 18. In response to identifying improper movement of the display 18, the gaming machine 10 may be configured to alert staff members via any suitable means (e.g., visual signals, audible signals, data signals, etc.). These alerts may be configured to subside in response to approval from a staff member or in response to the upper display 18 returning to the intended position.

The foregoing systems and methods describe a gaming machine with a hinged display assembly. Although the foregoing systems and methods describe at least one configuration for securely and safely mounting displays to a gaming machine, it is to be understood that other suitable methods and mechanisms may be contemplated by the foregoing description. For example, rather than a cable winch assembly, the upper display may be lifted view a belt-based system. Moreover, although the foregoing systems and methods are described in relation to a dual display configuration, it is to be understood that other suitable gaming machine configurations with one, three, or more displays incorporated the features and functions described above may be contemplated as within the spirit and scope of the present disclosure. For example, a gaming machine including one display may still use a mounting method similar to the upper display 18. In another example, a gaming machine with three displays may include two displays similar to the displays 18, 20 as well as an intermediate display that may combine the features and/or functions the outer displays 18, 20 to facilitate installation and secure mounting.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The invention claimed is:

1. A method of assembling a gaming machine, the gaming machine including a cabinet, a lower display, and an upper display, the cabinet including a lower support and an upper support, the upper support being hinged to the lower support, the upper support being rotatable relative to the lower support between a lower position and an upper position, wherein the upper support overlaps the lower support when the upper support is in the lower position, wherein the upper support is disposed above the lower support when the upper support is in the upper position, the lower display and the upper display initially being separate from the cabinet, the method comprising the operations of:

rotating the upper support from the lower position to the upper position;

while the upper support is in the upper position, mounting the upper display onto the lower support;

connecting the mounted upper display to a winch extending between the lower support and the upper support;

operating the winch to lift the upper display from the lower support to the upper support; and after the upper display is lifted from the lower support to the upper support, mounting the lower display onto the lower support.

2. The method of claim 1, wherein the winch is operated with at least one of a crank or a motor.

3. The method of claim 1, wherein the lower support includes a damping device, and wherein the operation of mounting the lower display includes pushing the lower display against the damping device.

4. The method of claim 1, wherein the connecting operation includes connecting a hook of the winch to a rear bracket of the upper display.

5. The method of claim 1, wherein the operation of operating the winch to lift the upper display includes lifting the upper display by a sufficient amount that a gap will exist between the lifted upper display and the lower display that is subsequently mounted onto the lower support, and further including the operation of operating the winch in reverse to lower the upper display to close the gap.

6. The method of claim 1, wherein the lower and upper displays and the lower and upper supports have corresponding concave configurations.

7. The method of claim 1, wherein a combination of the lower and upper supports forms at least one rail, wherein the upper display includes at least one bearing moveably coupled within the at least one rail, and wherein as the upper display is lifted from the lower support to the upper support, the at least one bearing rides along the at least one rail.

8. The method of claim 7, wherein the at least one rail includes a pair of parallel rails, and wherein the at least one bearing includes at least two parallel bearings.

9. A gaming machine assembly comprising:

a cabinet including a lower support and an upper support, the upper support being hinged to the lower support, the upper support being rotatable relative to the lower support between a lower position and an upper position, wherein the upper support overlaps the lower support when the upper support is in the lower position, wherein the upper support is disposed above the lower support when the upper support is in the upper position;

an upper display initially mounted onto the lower support while the upper support is in the upper position;

a winch extending between the lower support and the upper support, the winch being connected to the mounted upper display and, when the upper support is in the upper position, operable to lift the upper display from the lower support to the upper support; and a lower display mounted onto the lower support after the upper display is lifted from the lower support to the upper support.

10. The gaming machine assembly of claim 9, wherein the winch is operable with at least one of a crank or a motor.

11. The gaming machine assembly of claim 9, wherein the lower support includes a damping device configured to dampen the lower display as it is mounted onto the lower support.

12. The gaming machine assembly of claim 9, wherein the winch includes a hook, and wherein the upper display includes a rear bracket, the hook of the winch being connected to the rear bracket of the upper display.

13. The gaming machine assembly of claim 9, wherein the winch is operable to lift the upper display by a sufficient amount that a gap will exist between the lifted upper display and the lower display that is subsequently mounted onto the lower support, and wherein the winch is further operable in reverse to lower the upper display to close the gap.

14. The gaming machine assembly of claim 9, wherein the lower and upper displays and the lower and upper supports have corresponding concave configurations.

15. The gaming machine assembly of claim 9, wherein a combination of the lower and upper supports forms at least one rail, wherein the upper display includes at least one bearing moveably coupled within the at least one rail, and wherein as the upper display is lifted from the lower support to the upper support, the at least one bearing rides along the at least one rail.

16. The gaming machine assembly of claim 15, wherein the upper display includes a coupling assembly configured to selectively engage within the at least one rail in response to the upper display being lifted.

17. The gaming machine assembly of claim 9, wherein the lower and upper supports each include a respective cross-brace.

18. A gaming machine assembly comprising:

a cabinet including a lower support and an upper support, the upper support being hinged to the lower support, the upper support being rotatable relative to the lower support between a lower position and an upper position, wherein the upper support overlaps the lower support when the upper support is in the lower position, wherein the upper support is disposed above the lower support when the upper support is in the upper position;

a winch extending between the lower support and the upper support;

a lower display; and an upper display;

wherein while the upper support is in the upper position, the upper display is mounted onto the lower support, connected to the winch, and then lifted from the lower support to the upper support by operating the winch; and wherein after the upper display is lifted from the lower support to the upper support, the lower display is mounted onto the lower support.

19. The gaming machine assembly of claim 18, wherein while the upper support is in the upper position, the upper display is lifted by a sufficient amount that a gap will exist between the lifted upper display and the lower display that is subsequently mounted onto the lower support, and wherein after the lower display is mounted onto the lower support, the upper display is lowered to close the gap by operating the winch in reverse.

20. The gaming machine assembly of claim 18, wherein a combination of the lower and upper supports forms at least one rail, wherein the upper display includes at least one bearing moveably coupled within the at least one rail, and wherein as the upper display is lifted from the lower support to the upper support, the at least one bearing rides along the at least one rail.

* * * * *